(12) United States Patent
Ostrikov et al.

(10) Patent No.: US 11,567,844 B2
(45) Date of Patent: Jan. 31, 2023

(54) NONVOLATILE MEMORY DEVICES, SYSTEMS AND METHODS FOR FAST, SECURE, RESILIENT SYSTEM BOOT

(71) Applicant: Infineon Technologies LLC, San Jose, CA (US)

(72) Inventors: Sergey Ostrikov, Fremont, CA (US); Florian Schreiner, Grasbrunn (DE)

(73) Assignee: INFINEON TECHNOLOGIES LLC, San Jose, CA (US)

( * ) Notice: Subject to any disclaimer, the term of this patent is extended or adjusted under 35 U.S.C. 154(b) by 0 days.

(21) Appl. No.: 17/356,390

(22) Filed: Jun. 23, 2021

(65) Prior Publication Data
US 2022/0229748 A1 Jul. 21, 2022

Related U.S. Application Data

(60) Provisional application No. 63/166,283, filed on Mar. 26, 2021, provisional application No. 63/139,944, filed on Jan. 21, 2021.

(51) Int. Cl.
| | |
|---|---|
| *G06F 11/00* | (2006.01) |
| *G06F 11/22* | (2006.01) |
| *G06F 9/4401* | (2018.01) |
| *G06F 21/57* | (2013.01) |

(Continued)

(52) U.S. Cl.
CPC ........ *G06F 11/2284* (2013.01); *G06F 9/4403* (2013.01); *G06F 11/0727* (2013.01); *G06F 11/0757* (2013.01); *G06F 11/1417* (2013.01); *G06F 21/572* (2013.01); *G06F 2221/033* (2013.01)

(58) Field of Classification Search
CPC ............ G06F 11/0757; G06F 11/1417; G06F 11/2284; G06F 21/44; G06F 21/57; G06F 21/572; G06F 21/575; G06F 2221/2129; G06F 9/4403

See application file for complete search history.

(56) References Cited

U.S. PATENT DOCUMENTS

2003/0005277 A1* 1/2003 Harding ................ G06F 21/575
714/E11.133
2006/0236150 A1* 10/2006 Lintz ................... G06F 11/1417
714/6.13

(Continued)

OTHER PUBLICATIONS

Ostrikov, Sergey, Resilient Boot, 2021, IEEE (Year: 2021).*

*Primary Examiner* — Marc Duncan

(57) ABSTRACT

A storage device can include at least one nonvolatile (NV) memory array that includes a first section having a first physical address range, and a second section having a second physical address range. A nonvolatile fault indication can be set to at least a fault state or a no-fault state. A memory watchdog circuit configured to set the fault indication to the fault state in response to an expiration of a predetermined watchdog period, the watchdog period being reset in response to a defer indication. An address mapping circuit can be configured to, in response to the fault indication having the no fault state, mapping input addresses to the first physical addresses range, and in response to the fault indication having the fault state, mapping the same input addresses to the second physical address range. Corresponding methods and systems are also disclosed.

17 Claims, 17 Drawing Sheets

(51) Int. Cl.
    *G06F 11/14*         (2006.01)
    *G06F 11/07*         (2006.01)

(56) References Cited

U.S. PATENT DOCUMENTS

| | | | |
|---|---|---|---|
| 2012/0011393 A1* | 1/2012 | Roberts | G06F 11/1417 |
| | | | 711/E12.078 |
| 2012/0246384 A1* | 9/2012 | Lin | G06F 12/0246 |
| | | | 711/E12.008 |
| 2017/0153898 A1* | 6/2017 | Hayashi | G06F 11/3041 |
| 2021/0149681 A1* | 5/2021 | Alon | G06F 21/572 |

\* cited by examiner

```
                    [POR]  864-0
          ┌  ─────────────────────────────────────────
          │  [ROM ] initializing [Serial] controller
   866-0 ─┤  [ROM ] fetching code from [NOR] to [SRAM]
          │  [ROM ] branching to [SRAM]
          └  ─────────────────────────────────────────
          ┌  [SRAM] starting watchdog timer
   868-0 ─┤  [SRAM] initializing [DRAM] controller
          │  [SRAM] fetching code from [NOR] to [DRAM]
          └  [SRAM] branching to [DRAM]
             ─────────────────────────────────────────
          ┌  [DRAM] health check [FAIL]
          │  ─────────────────────────────────────────
   870   ─┤  [SRAM] watchdog timer expired
          └  [SRAM] resetting MCU
                    [POR]  864-1
             ─────────────────────────────────────────
          ┌  [ROM ] initializing [Serial] controller
   866-1 ─┤                   ┆
          └  [ROM ] branching to [SRAM]
             ─────────────────────────────────────────
          ┌  [SRAM] trying to recover
   872   ─┤  [SRAM] fetching original image
          │  [SRAM] restoring original image
          └  [SRAM] resetting MCU
                    [POR]  864-2
             ─────────────────────────────────────────
          ┌  [ROM ] initializing [Serial] controller
   866-2 ─┤                   ┆
          └  [ROM ] branching to [SRAM]
             ─────────────────────────────────────────
          ┌  [SRAM] starting watchdog timer
   868-2 ─┤  [SRAM] initializing [DRAM] controller
          │  [SRAM] fetching code from [NOR] to [DRAM]
          └  [SRAM] branching to [DRAM]
             ─────────────────────────────────────────
    874      [DRAM] health check [OK]
```

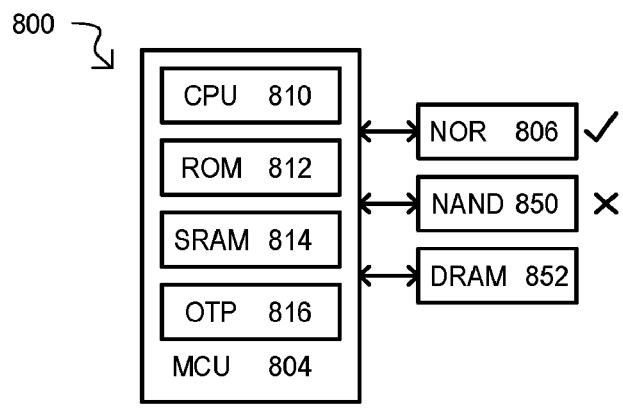

FIG. 8A (BACKGROUND)

(BACKGROUND)

(BACKGROUND)

(BACKGROUND)

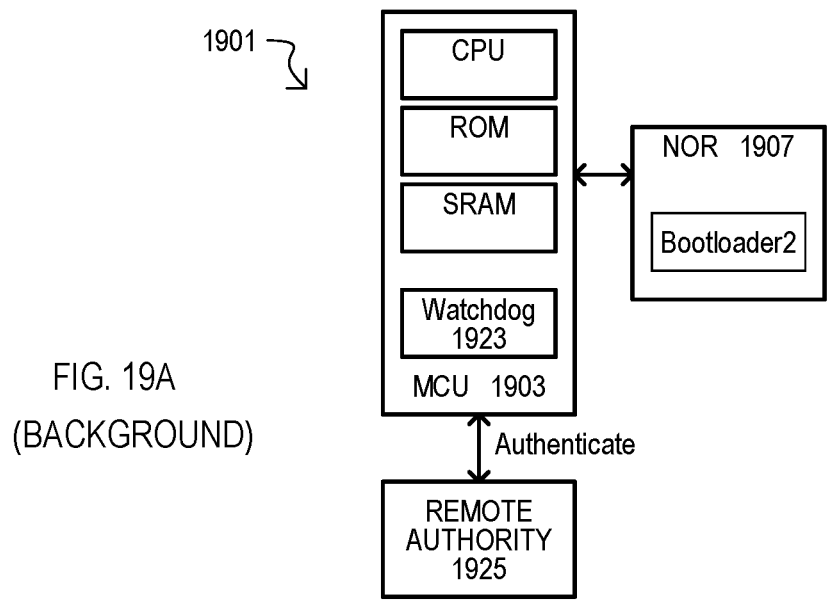
FIG. 19A (BACKGROUND)
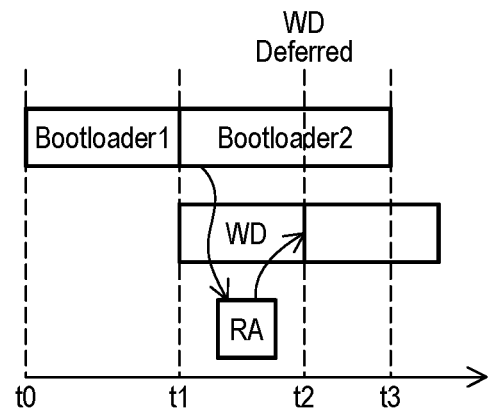
FIG. 19B (BACKGROUND)
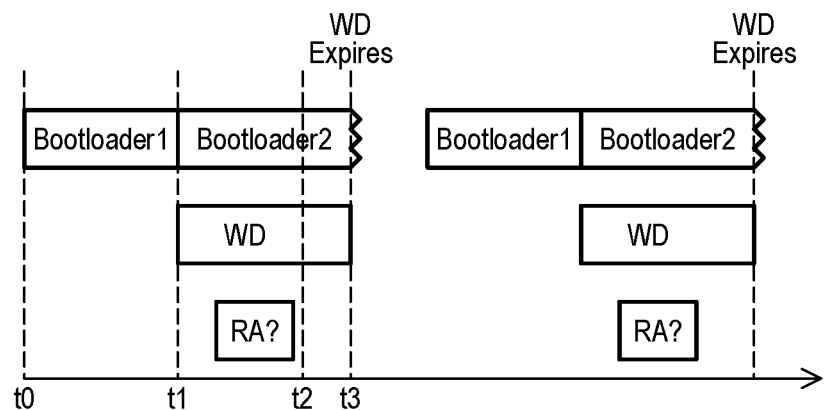
FIG. 19C (BACKGROUND)

NONVOLATILE MEMORY DEVICES, SYSTEMS AND METHODS FOR FAST, SECURE, RESILIENT SYSTEM BOOT

RELATED APPLICATIONS

This application claims the benefit of U.S. Provisional Patent Applications No. 63/139,944 filed Jan. 21, 2021, and No. 63/166,283 filed Mar. 26, 2021, the contents all of which are incorporated by reference herein.

TECHNICAL FIELD

The present disclosure relates generally to nonvolatile memory devices that store boot code for a system, and more particularly to nonvolatile memory devices that can enable fast and resilient system boots.

BACKGROUND

Systems NOR flash memories have traditionally been used for code storage in applications requiring high reliability across a wide temperature range. Embedded systems inside an automobile is one example of such an application. Current-generation automotive microcontroller units (MCUs) rely on embedded NOR flash. As automotive MCU manufacturers shift towards more advanced process nodes, embedding flash memory onto the same silicon die as the MCU processor can present technological and manufacturing challenges. Adding embedded flash memory to existing MCU logic (e.g., CMOS) requires a larger number of fabrication masks, adding to production cost and complexity. While replacements for embedded NOR flash memory have been proposed, such as MRAM, such alternate memory types have yet to be reliably employed.

To address these challenges, two distinct responses have emerged. One is systems-in-package (SiP) integration, and the other is to employ standalone NOR flash. In both cases, a NOR flash memory device can be separate from a corresponding MCU (e.g., different die or integrated circuit package). Both SiP and standalone approaches can provide very cost-effective solutions. However, one drawback of separate devices can be security concerns, including the ability to alter important code stored within the NOR device, particularly boot code executed by the MCU in a startup operation.

To address such security concerns, conventional approaches have sought to secure the boot process. Conventional approaches have relied on cryptography to verify code before MCU is allowed to execute the code. However, code verification can result in increased boot time. Several conventional methods to speed up a secure boot process have been proposed, including performing code verification in parallel with the booting operation and postponing verification to a later point in the boot process. However, these conventional methods have been impractical.

To better understand features and advantages of the disclosed embodiments, boot options and configurability of conventional systems employing a MCU and separate NOR flash device will be described.

FIG. 16 shows conventional booting options for a system 1601. Upon becoming operational, a flash-less MCU (i.e., and MCU without embedded flash memory) performs an immutable hardware configuration step (A) before allowing execution of boot code. Modern MCUs are designed to accommodate multiple boot options (B0 to BN) commonly based on available interfaces for various types of nonvolatile memories. MCU manufacturers offer one-time or dynamically configurable boot options. Boot options are shown as 1603 in FIG. 16.

Dynamic configurability is achieved by relying on external pins 1605 while the use of a single boot option can be guaranteed by blowing internal non-resettable fuses 1607. Once configured, the system 1601 boots in a predefined way. Immutable code (A) performs minimal system initialization and passes control to the first mutable code. First mutable code (B0 to BN) initializes complex peripherals and transfers control to an operating system.

Security-aware systems offer boot options where the hard-coded branch is conditional, so that the MCU either executes verified code or fails to boot. This method can be extended to create a chain of layers or code blocks that are executed only if verified. However, the effect of additional code verification routines on system performance is not linearly spaced across time, but rather inversely proportional to the time at which these routines are performed. In other words, the earlier code verification occurs in the boot process, the more adverse the effect on boot performance (e.g., time to boot). One of the reasons for such effects can be computing resource availability inside the MCU as it starts up (e.g., comes out of power-on reset). Some multi-core processors boot from a single core while the remaining cores wait to be enabled by software. Consequently, when the code that enables secondary cores comes from an off-chip memory and needs to be verified, not all computing resources are available until verification is complete. Even when additional cores are not needed for verification, as with MCU that include hardware cryptography blocks, such MCUs can initially boot with fail-safe performance settings such as a reduced system clock frequency, which also impedes to goal of a fast boot time.

In addition to performance impact, the integration and maintenance effort associated with embedding verification into the boot code raises additional practical considerations. Multiple stakeholders are involved in developing the booting process in an embedded system: the MCU manufacturer, the memory (e.g., NOR flash) manufacturer, developers who generate bootloader code, operating system code, and application code. All of these can be separate entities. While such segregation results in high performing separate components, due to specialization, extensive coordination and integration efforts can be required to optimize a system boot process.

MCU functionality is largely defined by the code stored in non-volatile memories. MCUs typically include on-chip read only memory (ROM). The size of on-chip ROM is determined by the amount of logic that MCU manufacturers can safely finalize before tape-out. The size of ROM tends to be minimal in comparison with the initialization and boot logic, which is pushed over to an external flash device. Unlike ROM code, which is inherently trusted due to its immutability, location, and extensive design review, flash code must undergo periodic verification. Periodic verification has become an established practice because many conventional standalone NOR flash devices have lacked any on-chip security infrastructure to provide a level of assurance that approaches that of on-chip ROM.

For systems with MCUs and external memory (e.g., NOR flash), a level of code assurance can be achieved via a combination of device authentication and code verification. Device authentication can include a cryptographic exchange between the MCU and external flash device to ensure the identity of the flash device. Device authentication can help guard against a swapping of the physical flash die and ensures that the state of the flash device remains intact.

Currently some type of security infrastructure is becoming implemented for many standalone flash devices, and the standards organization JEDEC is working toward a NOR flash authentication standard. Consequently, MCU manufacturers are increasingly more likely to include flash authentication support into the ROM of the MCUs.

Code verification can take various forms, including but not limited to the MCU comparing code received from an external memory against an expected value, such as a hash or other value generated for the code. Some verification processes can also include a cryptographic exchange. While device authentication can be included in some systems, code verification remains the deciding step in securing the boot process.

FIG. 17 is a block diagram showing a boot operation of a conventional embedded system 1701. A system 1701 can include an MCU 1703, NAND flash memory 1705, NOR flash memory 1707, and DRAM 1709, all formed on different chips (e.g., dice). MCU 1703 can include a processor (e.g., CPU) 1711, ROM 1713, SRAM 1715 and one-time programmable (OTP) memory 1717. An address space 1719 accessible by CPU 1711 can include the various memory types, including those on-chip (i.e., on the MCU 1703) as well as off-chip.

FIG. 17 shows components and control transfer points in time. At time t=0, a CPU can execute ROM code (Bootloader1) 1721-0. When a system further boots from an external NOR flash memory 1707, ROM code 1721-0 can initialize a serial peripheral interface (SPI) controller so that it can fetch the further initialization routines 1721-1 (Bootloader2) from NOR flash memory 1707 to SRAM 1715 (between times t=1 and t=2). These routines configure several peripherals one of which is a DRAM controller. Once DRAM is available, at time t=3 an operating system kernel 1721-2 is copied from NOR flash memory 1707 to DRAM 1709 and control is passed to system kernel. Application code 1721-3 stored by NAND flash memory 1705 can then be executed.

A critical control transfer happens when ROM code 1721-0 branches to SRAM code 1721-1. If code verification is not performed before this point, there is a window of opportunity for unverified code to take over the execution flow. As noted, executing code verification prior to this point can be costly in terms of boot performance. Accordingly, conventional systems can include code verification deferral. In code verification deferral, a system is allowed to boot (with some safeguards), and then the code is verified subsequently. If verification fails, the system can enter a recovery operation.

Accordingly, conventional embedded systems relying on external NOR flash for booting can have two approaches to booting operations: a fast boot and no ability to recover, as fast boot is achieved via code verification deferral; or a slow (secure) boot, with the ability to recover. While a slow boot can provide security, it can be unsuitable for some applications, such as those requiring a boot operation to conclude within a limited time period.

FIG. 18A is a timing diagram showing a slow and secure boot operation. An application processor (e.g., a flash-less MCUs) boots from internal ROM (bootloader1). Bootloader 1 preliminarily configures the MCU and fetches subsequent code (bootloader2) from an external non-volatile memory (e.g., NOR flash).

At time t=0, operating on code from bootloader1, an MCU can authenticate the external NOR device. Once the NOR device has been authenticated, at time t=1, MCU can transfer or examine code stored by the NOR device (e.g., bootloader2), shown as "content verification". Since bootloader #2 comes from off-chip (e.g., off the MCU chip), it needs to be verified before control is passed to it. Existing solutions rely on cryptography to verify subsequent code. Code verification is a slow operation that can result in some system deadlines not being met. This is shown at time t=2, which can be an availability deadline for the MCU, at which time the MCU needs to be available to communicate with other devices of a system. For example, within an automobile, an MCU may be required to communicate over a CAN bus within 50 ms, but not necessarily be ready to perform any application-specific actions.

At time t=3, different actions can occur based on a code verification result. If code from the NOR device (e.g., bootloader2) passes verification (pass), the code can be executed as normal. However, if the code fails (fail), a system can execute a recovery operation, which can seek to remedy the bad code. At time t=4, an application deadline can occur. At this point in time, a system should be ready to execute application code.

FIG. 18B is a timing diagram showing a faster boot operation that sacrifices security for speed. The "availability deadline" problem can be addressed by ROM code (bootloader1) passing control to NOR code (bootloader2) without completing verification of the NOR code.

At time t=0, the NOR device can be authenticated. At time t=1, before the availability deadline, the MCU can execute NOR code. NOR code verification can also start before the availability deadline, however, the code verification will not be complete. At time t=3, a system can continue with normal operations or execute a recovery operation depending upon a code verification result.

While an approach like that of FIG. 18B can meet the availability deadline, the system loses the ability to recover in all cases, as control is passed to potentially unverified code.

The use of watchdog timers by application processors in embedded systems is known. However, a system that boots from an external flash can have altered boot code that can maliciously defer such a watchdog timer despite running unverified code. To circumvent this problem, conventional systems typically offload detection to a remote authority. Failure of an embedded system to prove its integrity to a remote authority results in a watchdog expiration. Communication between an embedded system and a remote authority over an insecure channel can be supported by making the watchdog deferral an authenticated procedure.

FIGS. 19A to 19C are diagrams showing conventional systems that include an authenticated watchdog timer. FIG. 19A shows a conventional system 1901 with an MCU 1903 having a watchdog timer 1923. MCU 1903 can initially boot with boot code from an internal ROM (Bootloader1), and then continue boot operations with boot code (Bootloader2) on an external NOR device 1907. MCU 1903 can communicate with a remote authority 1925 with an authenticated procedure.

FIG. 19B is a timing diagram showing a "good" boot operation. At time t=0, an MCU can boot with code from an internal ROM (Bootloader1). At time t=1, the MCU can boot with code from an external NOR device (Bootloader2). At about the same time, MCU can start a watchdog timer (WD). Watchdog timer (WD) can be deferred by defer messages from a remote authority (RA). FIG. 19B shows MCU reporting to RA, and RA deferring WD at time t=2. At time t=3 a system can have successfully booted with Bootloader2 code.

FIG. 19C shows a timing diagram of a boot operation that generates a watch dog fault. FIG. 19C shows the same operations as FIG. 19B. However, because Bootloader2 code is invalid, RA does not defer WD. Consequently, WD expires at time t=t3, causing a fault condition (e.g., power-on/reset).

The addition of an authenticated watchdog allows a MCU to retain the control and force the system into a known state: executing ROM code (e.g., Bootloader1) after a configurable timeout. This is a useful, but limited response because it is infeasible to embed recovery code into ROM. As a result, as shown in FIG. 19C, the watchdog expiration cycle can repeat itself. That is, while the addition of a watchdog timer can provide for a fast and secure boot, the system is not resilient, it cannot easily recover from the fault state.

It would be desirable to arrive at some way or providing a boot operation that is both fast, secure and resilient, for systems that store boot code in an external nonvolatile memory.

BRIEF DESCRIPTION OF THE DRAWINGS

FIGS. 8A to 8C are diagrams showing boot and recovery operations of a system according to embodiments.

FIGS. 19A to 19C are diagrams showing a conventional system with a watchdog timer and corresponding boot operations.

DETAILED DESCRIPTION

Figure 1:
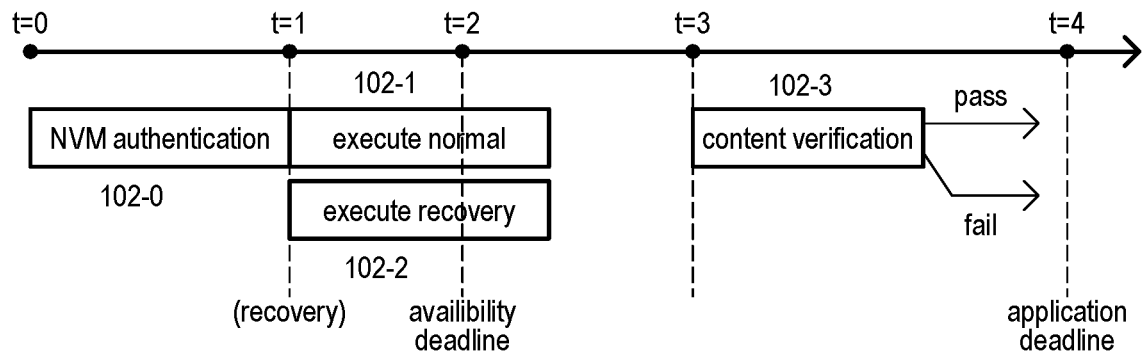
FIG. 1 is a timing diagram showing boot operations of a system according to an embodiment.

According to embodiments, systems with a controller device (e.g., MCU) that rely on an external, nonvolatile memory (NVM) device (e.g., NOR flash) to store boot code can boot quickly while at the same time retaining the ability to recover from fault states (i.e., resilience).

According to embodiments, boot time can be reduced by shifting the integrity check of externally stored boot code to an application layer (i.e., time period after basic boot functions are complete), thus bypassing early boot integration. In some embodiments, an application layer operation can communicate with a standalone NVM device storing boot code, in order to force the system into a known state at the boot level.

In the various embodiments below, like items are referred to by the same reference characters, but with the leading digit(s) corresponding to the figure number.

FIG. 1 is a timing diagram of a boot operation according to an embodiment. In FIG. 1, a system can meet an availability deadline while at the same time remaining recoverable. At time t=0, it is assumed a system processor (e.g., MCU) has executed initial boot code (e.g., Bootloader1) from an internal (e.g., on-chip, embedded, integrated) memory, such as a ROM or the like. A system processor can authenticate an external (i.e., off-chip, standalone) NVM device 102-0. Such an operation can take any suitable form, including a cryptographic exchange that includes an identification value unique to the NVM device.

At time t=1, a system can execute code stored on the authenticated NVM device. However, unlike conventional approaches, the code executed will depend upon a nonvolatile state of the NVM device. If the NVM device has not experienced a previous fault state, the code accessed from the NVM device will be boot code, and the system will execute a normal boot operation 102-1. However, if the NVM device is in a (previously established) fault state, the code accessed from the NVM device will be recovery code, and the system will execute a recovery operation 102-2. It is noted that the reading and execution of code by a system processor at time t=1 can involve the same type of access to the NVM device. That is, the system processor is unaware of the fault state. It is the nonvolatile state of the NVM device that controls whether a normal or recovery operation takes place.

A recovery operation can be an operation intended to address invalid boot code in the NVM device and can take any suitable form based on the system configuration. Recovery operations can include but are not limited to: restoring known good boot code, reading boot code from read-only addresses that are known to store good boot code, or reverting to a previous version of boot code.

Referring still to FIG. 1, time t=2 can be an availability deadline for the system. As shown, provided the boot operation proceeds on the execute normal 102-1 path, the system can be operational by the availability deadline.

At time t=3, a system can execute a code verification operation (e.g., content verification) 102-3. Such an operation can verify the boot code store by the NVM device. In this way, code verification is deferred until all boot code has been executed. In some embodiments, such code verification can occur at an application layer point in a boot process. In some embodiments, a system processor may have multiple cores. At the application layer point (e.g., time t=3 and later), a processor may have more cores enabled than during the initial boot process (e.g., prior to time t=3). Consequently, the deferred content verification operation 102-3 can be completed faster than if it was embedded in the boot process.

Time t=4 represents an application deadline. As shown, the fast boot process places the system at the application layer point well before the application deadline.

In this way, a system employing an external NVM device to store boot code can meet fast availability deadlines, while at the same time remaining recoverable.

Figure 2:
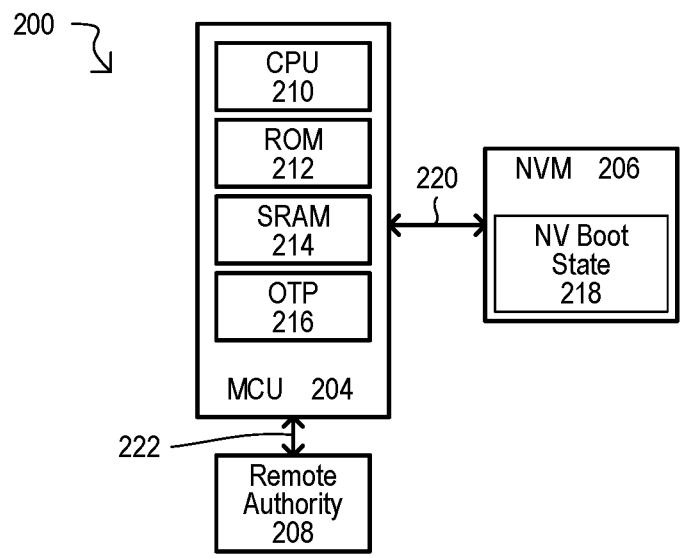
FIG. 2 is a block diagram of a system according to an embodiment.

FIG. 2 is a block diagram of a system according to an embodiment. A system 200 can include a microcontroller unit (MCU) 204, NVM device 206 and remote authority 208. While system 200 utilizes a MCU 204, alternate embodiments can include any suitable processor device or circuits, including but not limited to custom logic circuits, both hardwired and/or programmable. An MCU 204 can include a central processing unit (CPU) 210, ROM 212, SRAM 214 and one-time programmable memory (OTP) 216. CPU 210 can include processor circuits for executing instructions, including boot code stored in ROM 212 and NVM 206. A ROM 212 can store initial boot code (e.g., Bootloader1) for execution by CPU 210 in response to predetermined conditions, such as power-on/reset (POR). SRAM 214 can serve as a fast access storage for CPU 210. In some embodiments, SRAM is volatile memory, losing stored data in the absence of power. In some embodiments, CPU 210 can transfer boot code (e.g., Bootloader2) from NVM 206 to SRAM 214 for execution. OTP 216 can provide additional nonvolatile storage for data values.

In some embodiments, ROM 212, SRAM 214 OTP 216 can be part of the same MCU device 204. This can include such circuits being formed in a same integrated circuit package and/or on a same die.

NVM device 206 can provide nonvolatile storage for data used by MCU 204, including boot code (e.g., Bootloader2). NVM device 206 can include an address mapping circuit and have a NV boot state 218. According to such a NV boot state, NVM device 206 can provide boot code or alternatively, recovery code for MCU 204 in a boot operation. NVM device 206 can be connected to MCU 204 by a memory bus 220. A memory bus 220 can take any suitable form, including a serial or parallel bus. In some embodiments, a memory bus 220 can be a serial bus compatible with a standard, including but not limited to SPI, CAN and I²C.

A remote authority 208 can be a trusted source of control messages for the system 200. A remote authority 208 can issue indications to defer watchdog circuits in MCU 208 and/or in NVM device 206. A remote authority 208 can be a device present in an overall system that includes MCU 204 and NVM device 206 or can be a device not in proximity to MCU 204/NVM device 206, such as a server in communication via one or more networks, including wireless networks. Remote authority 208 can be in communication with MCU 204 over a communication channel 222. A communication channel 222 can take any suitable form, including a wired connection, wireless connection, or some combination thereof. In some embodiments, a remote authority 208 can communicate with MCU 204 according to an authentication protocol. In some embodiments, remote authority 208 can be in communication with NVM device 206. Communication between remote authority 208 and NVM device 206 can be via MCU 204 through memory bus 220. However, in other embodiments, remote authority 208 can have a direct communication channel (not shown) with NVM device 206.

According to embodiments, nonvolatile circuits within an external NVM device can be employed to break out of a fault cycle and enforce the results of code verification. In some embodiments, this can include using a nonvolatile value to control which image is exposed at a location in the NVM device from which the MCU will fetch code (e.g., while operating under ROM code). In the case of successful verification, the NVM device can expose normal boot code so that the system can boot as quickly (e.g., as fast as the design allows without any additional steps). In the case of failed verification, the NVM device can expose a recovery image at the same logical location so that the system can boot directly into recovery. In this way, there is no need for prior boot code (e.g., ROM code) to differentiate between a normal boot and a recovery boot.

In some embodiments, the execution of a boot process beyond initial, trusted code (e.g., ROM code) can be controlled by watchdog circuits. One watchdog circuit can reside in the controller device (e.g., MCU) and the other can be a non-volatile watchdog circuit residing in the external NVM device. A non-volatile watchdog circuit can operate in the same manner as a conventional watchdog circuit except its expiration (e.g., fault) indication can persist in the absence of power (e.g., across power-on resets). The non-volatile fault indication can control which image is exposed to the controller in the boot operation (i.e., boot code or recovery code). A normal boot expects both watchdogs to be deferred by a remote authority within their configurable timeouts. If this condition is not satisfied, no explicit communication is needed for the system to boot into recovery.

In this way, watchdog circuits can be used to enforce the result of a health check at the boot level without compromising system performance. The partial, but immediate assurance that boot code is valid can be provided by authenticating the NVM device. A complete, but delayed assurance that the boot code is valid can be provided via a deferred integrity check (code verification). Despite having a window of opportunity for unverified code to run, the two-device system (e.g., controller and NVM device) can retain control to force the system into a known state. And, unlike other conventional solutions, such as that shown in FIGS. 19A to 19C, the known state can extend beyond initial boot code (e.g., ROM code) and include recovery logic.

In some embodiments, verification can occur at an application level in the boot process. This can enable the execution of thorough system inspections which can extend beyond a boot media integrity check and even include run-time parameters. Lastly, the shift of the verification of boot code to the application level bypasses early boot and operating system integration making it a practical system-level solution.

Figure 3A:
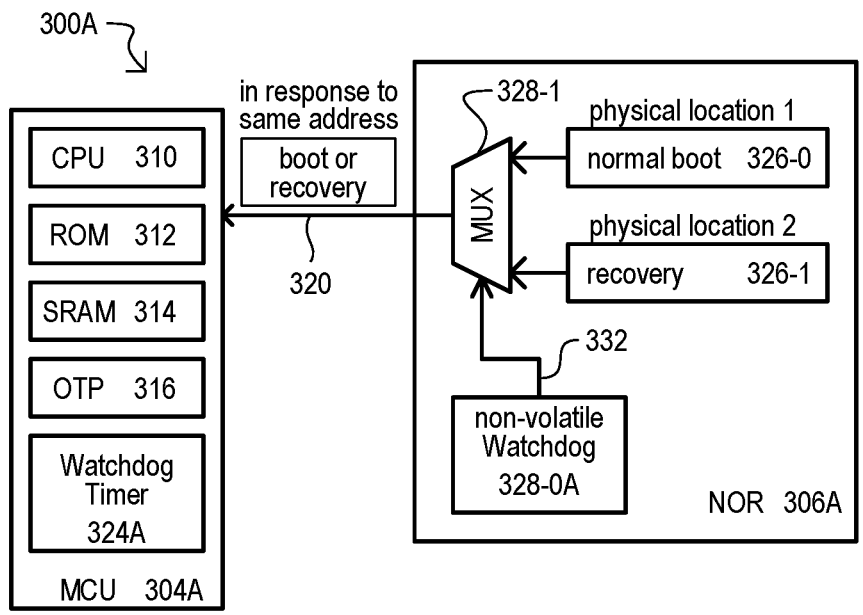
FIGS. 3A to 3C are block diagrams of systems with external nonvolatile memory (NVM) devices according to embodiments.

FIG. 3A is a block diagram of a system 300A according to another embodiment. A system 300A can include a MCU 304A and NOR (flash) device 306A. While embodiments disclosed herein describe systems with NOR devices, alternate embodiments can include any other suitable nonvolatile memory device. MCU 304A can include items like those of FIG. 2. In addition, MCU 304A can include a controller watchdog circuit 324A. A controller watchdog circuit 324A can run for a predetermined time period. If this time period is not deferred and expires, a controller watchdog circuit 324A places MCU 304A into a predetermined state (e.g., POR). A controller watchdog circuit 324A can be deferred by indications from sources external to MCU 304A.

NOR device 306A can include one or more nonvolatile memory cell arrays arranged into different physical locations (or sections). FIG. 3A shows a first location 326-0 that can store normal boot code (e.g., Bootloader2) and a second location 326-1 that can store recovery code.

NOR device 306A can further include a NV watchdog circuit 328-0A and an address mapping circuit 328-1. NV watchdog circuit 328-0A can provide a NV state indication 332. NV state indication 332 can vary depending upon whether NV watchdog circuit 328-0A indicates a fault state or normal state. In some embodiments, NV watchdog 328-

0A can initially output a NV state indication 332 of one value (i.e., no fault). If a watchdog time period for NV watchdog circuit 328-0A expires, NV watchdog 328-0A will switch the NV state indication 332 to another value (fault state) and will not reset this value unless predetermined actions occur (e.g., authenticated message). It is understood that NV state indication 332 is nonvolatile and thus persists through a POR cycle.

Address mapping circuit 328-1 can selectively map memory accesses to the NOR device 306A to first location 326-0 or second location 326-1 based on NV state indication 332. Accordingly, in a no fault state (NV watchdog 328-0A has not expired), address mapping circuit 328-1 can return normal boot code from 326-0. However, in a fault state (NV watchdog 328-0A has previously expired), address mapping circuit 328-1 can return recovery code from 326-1. In some embodiments, the operation of address mapping circuit 328-1 is entirely unknown to MCU 304A. That is, in response to the same addresses from MCU 304A, NOR device 306A can return boot code or recovery code depending upon fault state. While address mapping circuit 328-1 is represented with a multiplexer symbol, this should not be construed as limiting. A MUX is but one functional representation of an address mapping circuit 328-1. Embodiments can include any suitable address mapping circuit or system.

Figure 3B:
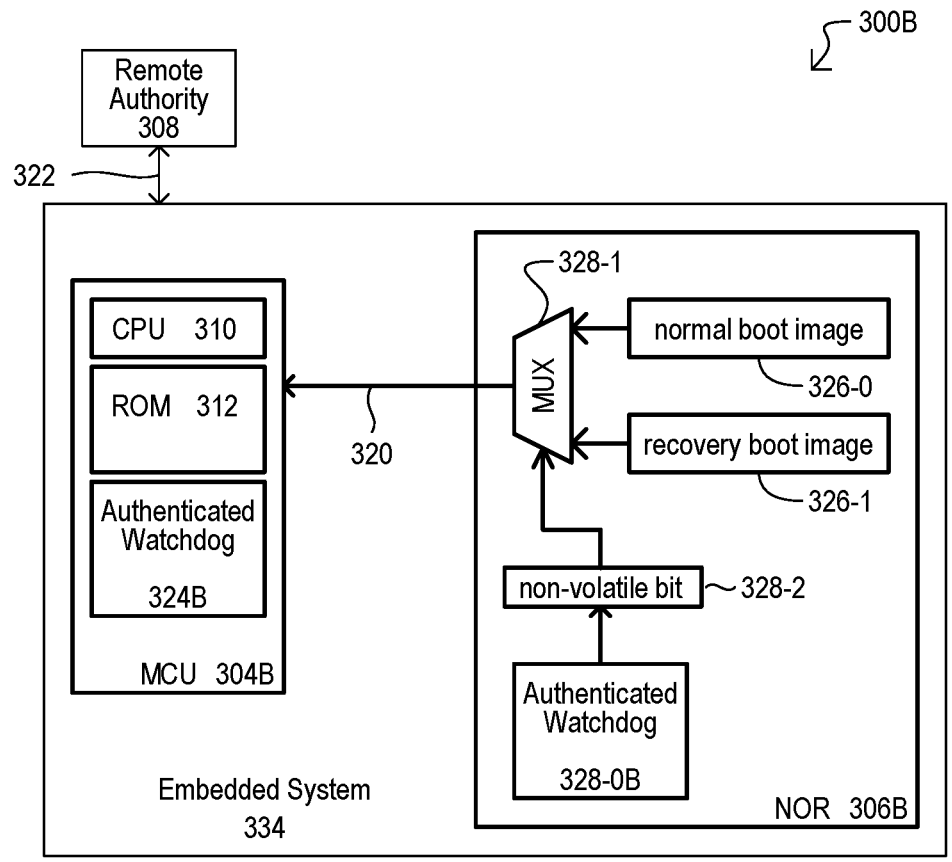

FIG. 3B shows a system 300B according to another embodiment. FIG. 3B can include items like those of FIG. 3A, but differs in that MCU 304B and NOR device 306B can form parts of an embedded system 334. Further, a system 300B can include a remote authority 308 in communication with the embedded system 334 over communication channel 322. MCU 304B can include an authenticated controller watchdog circuit 324B and NOR device 306B can include authenticated NV watchdog circuit 328-0B. In some embodiments, authenticated NV watchdog circuit 328-0B and/or authenticated controller watchdog circuit 324B can communicate with remote authority 308 according to an authentication process, and have watchdog time periods deferred by communications from remote authority 308.

FIG. 3B also differs from FIG. 3A in that an address mapping circuit 328-1 can be an address decoding circuit, with authenticated NV watchdog circuit providing a nonvolatile bit value 328-2. Such a bit value can be included in a decoding operation to map accesses between first location 326-0 and second location 326-1 in response to the same input address values. In some embodiments, NV bit value 328-2 can be one or multiple more significant bits (MSBs) of an address value applied to a decoder circuit.

In operation, system 300B can provide for a resilient boot. Within MCU 304B, in the event controller watchdog circuit 324B expires, the MCU 304B can restart (e.g., via POR). Controller watchdog circuit 324B can serve to force MCU 304B into a known state, which can include executing boot code in ROM 312 in case subsequent code (from NOR 306B) proves to be corrupted. For normal boot operations, the watchdog period for controller watchdog circuit 324B can be periodically deferred by signals or messages from remote authority 308.

Within NOR device 306B, in the event NV watchdog circuit 328-0B expires, a state of NV bit 328-2 can be changed. NV bit 328-2 controls which image is exposed for MCU 304B to fetch while executing ROM boot code. For the MCU 304B to boot normally, the NV watchdog circuit 328-0B also needs to be periodically deferred. Otherwise, NV bit can change and cause the NOR device 306B to expose a different image at the same logical address.

As noted herein, a NOR device 306B can present the "normal boot" and "recovery boot" at the same logical address. This can ensure that MCU 304B executing ROM code (which is immutable) will always fetch from the same logical address location of NOR device 306B. Said in another way, the MCU 304B cannot know why a reset event occurred, and so will not know if normal or recovery boot code is needed.

Figure 3C:
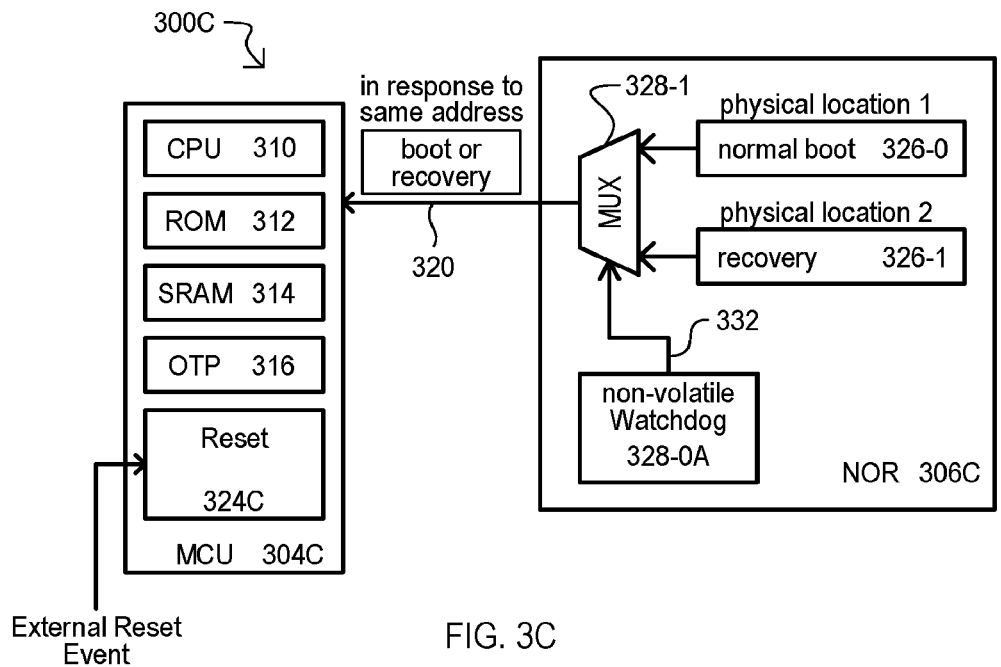

While embodiments can include MCUs with watchdog circuits to break out of a fault state, alternate embodiments can use different mechanism in lieu of a watchdog circuit. FIG. 3C shows one such embodiment.

FIG. 3C shows a system 300C according to another embodiment. FIG. 3C can include items like those of FIG. 3A. FIG. 3C differs from FIG. 3A in that MCU 304C includes a reset circuit 324C that can reset the MCU 304C (e.g., force POR) in response to an external reset event. An external reset event can take any suitable form and can be periodic (but not necessarily regular). As but one of many examples, a system 300C can be embedded in a larger system (e.g., automobile) that is periodically reset (e.g., automobile engine turns off to on).

Figure 4:
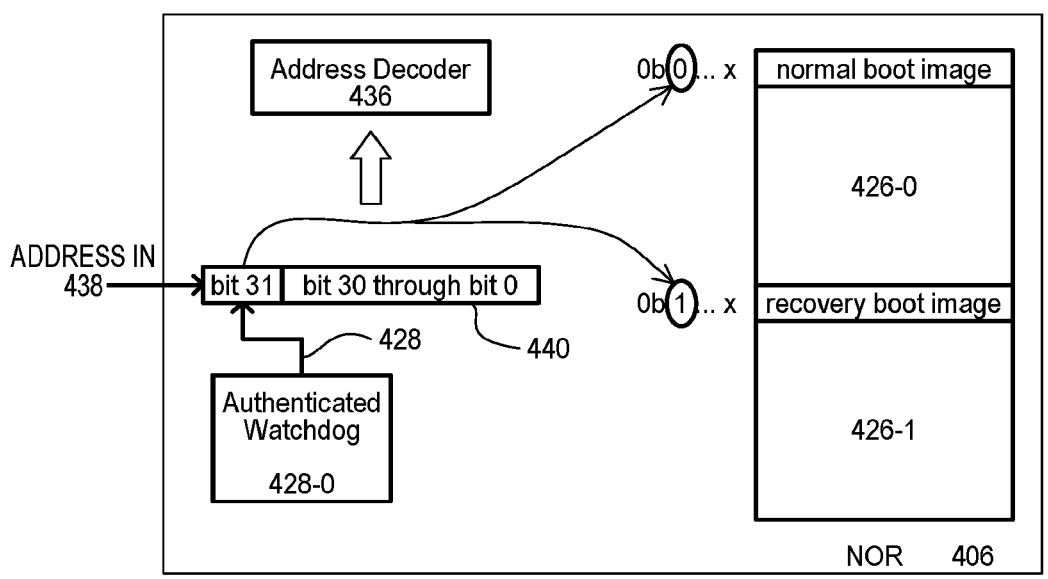
FIG. 4 is a block diagram of a memory address remapping operation of a NVM device according to an embodiment.

FIG. 4 is a block diagram of a NVM device 406 according to an embodiment. NVM device 406 can be a NOR flash device that includes a number of storage regions, including a first region 426-0 and second region 426-1, an authenticated watchdog 428-0, an address decoder 436, and internal address path 440. First region 426-0 is accessible via a physical address range starting at 0 . . . x, and can store a normal boot image. Second region 426-1 is accessible via a physical address range starting at 1 . . . x, and can store a recovery boot image. Authenticated watchdog circuit 428-0 can be a NV watchdog circuit as described herein or equivalents. Address decoder 436 can decode address values received on internal address path 440 to enable access to nonvolatile storage regions, including regions 426-0/1. Internal address path 440 can provide an address value to address decoder 436 which can include more significant bits (in this case MSB bit 31) and less significant bits (in this case bits 30:0). A value of MSB bit 31 can be established by a state of authenticated watchdog circuit 438-0. In particular, bit 31 can be "0" in a non-fault state, and "1" in a fault state. Less significant bits 30:0 can correspond to an input address 438 received on a memory bus or the like.

In some embodiments, NV bit 31 can be modified in two ways. Upon expiration of the NV watchdog period, the bit can be set to "1". Upon receipt of an authenticated input, the bit can be set to "1" (e.g., a code verification failed) or reset back to "0" (e.g., code verification successful). In some embodiments, such as illustrated in FIG. 3B, an authenticated input can be received from a remote authority in packet format. As noted herein, indications from a remote authority 308 can be received by NOR device 306B via MCU 304B, or via a direct path (not shown).

Figure 5:
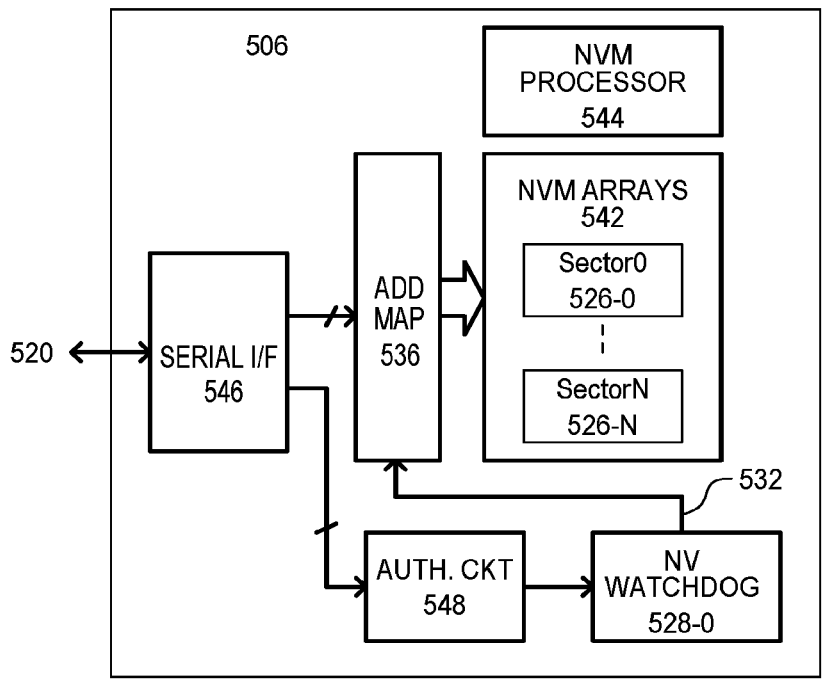
FIG. 5 is a block diagram of a NVM device according to another embodiment.

FIG. 5 is a block diagram of an NVM device 506 according to another embodiment. NVM device 506 can include NVM processor 544, NVM array(s) 542, address mapping circuit 536, serial interface (I/F) 546, authentication circuit 548, and NV watchdog circuit 528-0. NVM processor 544 can include processor circuits for executing functions of the NVM device 506. NVM arrays 542 can include one or more arrays of NVM cells arranged into different physical locations, shown as sectors 526-0 to 526-N. In some embodiments one or more sectors can be dedicated to boot code while one or more other sectors can be dedicated to recovery code. In some embodiments, physical addresses for boot code and recovery code can vary by one or more MSBs of the corresponding address, as described herein, or equivalents.

Address mapping circuit 536 can selectively map address received (i.e., logical addresses) to different physical addresses for NVM arrays 542 based on NV state indicator 532. In some embodiments, address mapping circuit 536 can include a decoder, however other embodiments can include any other suitable address mapping circuit 536, including circuits which assign portions of arrays (e.g., sectors) to different address ranges, such as block mapping circuits, or the like. A serial I/F 546 can transmit and receive data over a serial memory bus 520. In some embodiment, a serial I/F 546 can be connected to a controller device, such as a MCU of a larger system. Serial I/F 546 can provide values to address mapping circuit 536, as well as values to authentication circuit 548.

Authentication circuit 548 can include circuits for executing an authentication procedure for receiving and transmitting authenticated communications with another device. In some embodiments, authentication circuits 548 can receive defer communications, which can be forwarded to NV watchdog circuit 528-0 to defer a watchdog time period. Further, authentication circuits 548 can authenticate communications which can set or reset a NV state indicator 532. In some embodiments, authentication circuits 548 can include NVM processor 544 executing authentication code.

NV watchdog 528-0 can operate as described for other embodiments herein, or equivalents. When a watchdog period expires, NV state indication 532 can be set to one value. In response to predetermined inputs (e.g., an authenticated message), NV state indication 532 can be set to another value. NV watchdog 528-0 operates independently of any code stored by NVM arrays. In some embodiments, NV watchdog 528-0 can operate independently of NVM processor 544.

Figure 6:
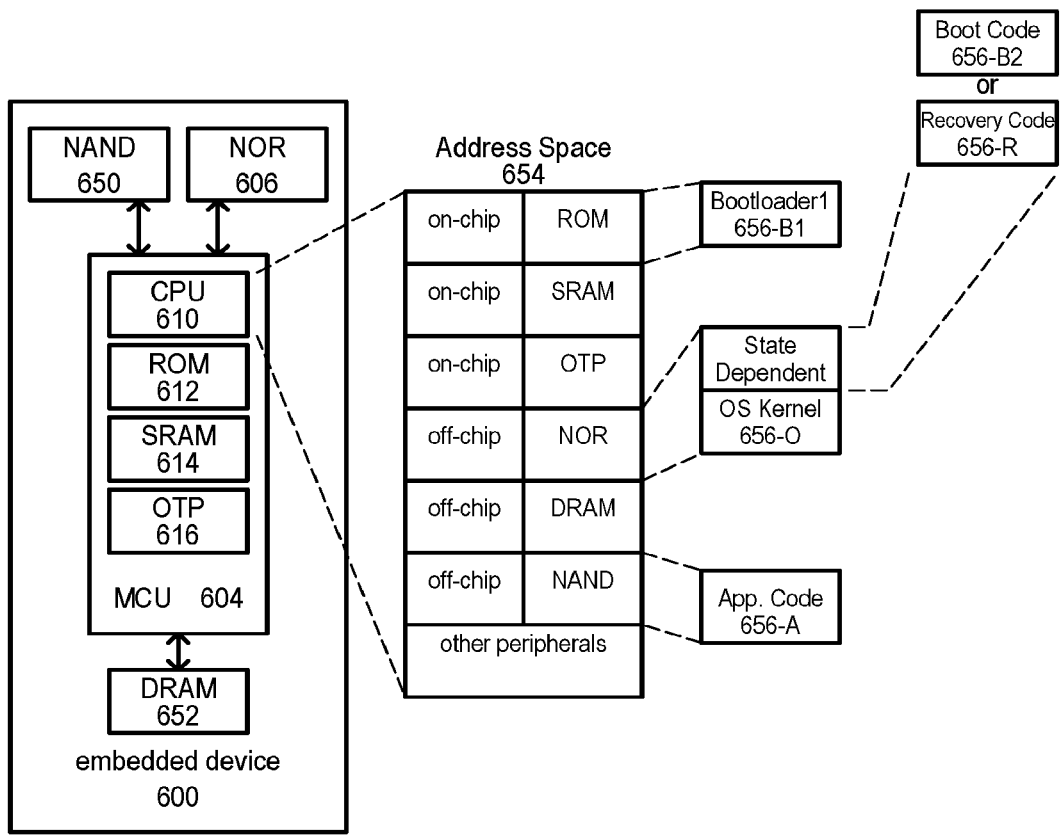
FIG. 6 is a block diagram showing an embedded system and corresponding memory address mapping according to an embodiment.

FIG. 6 is a block diagram of a system 600 according to another embodiment. A system 600 can be an embedded device have a specialized purpose in a larger system. Embedded device can include an MCU 604, NOR device 606, NAND device 650 and DRAM 652. MCU 604 and NOR device 606 can take the form of any of those disclosed herein or equivalents. A NAND device 650 can be a stand-alone device or a system that includes NAND storage. DRAM 652 can a standalone device or system that include DRAM storage. DRAM 652 can provide a volatile memory for system 600 of larger size and/or lower power consumption than SRAM 614. MCU 604 can include a CPU 610, ROM 612, SRAM 614, and OTP 616, which can take the form of those described herein or equivalents.

A system 600 can have an address space 654 accessible by a CPU 610. Address space 654 can include addresses corresponding to memory of the MCU 604 (i.e., on-chip memory) as well as memory external to the MCU 604 (i.e., off-chip memory). Address space corresponding to ROM 612 can store initial boot code (Bootloader1) 656-B1. Address space corresponding to NOR device 606 can store values that are dependent upon a state of a NV state indication in the NOR device (which can have a no-fault state or a fault sate). Thus, according to the state, NOR address space can provide second boot code (Bootloader2) 656-B2 or recovery code 656-R. NOR device 606 address space can also store an operating system (OS) kernel 656-0 for execution by CPU 610. A NAND device 650 can store application code 656-A. In some embodiments, application code can include code verification routines for verifying second boot code (Booloader2) 656-B2 (and possibly other code as well).

FIGS. 7A to 7D are a sequence of diagram showing operations of a system 700 according to embodiments. A system 700 can include an MCU 704, NOR device 706, and DRAM device 752. MCU 704 can include a CPU 710, ROM 712, SRAM 714, controller watchdog circuit 724, and DRAM controller 758. NOR device 706 can include NVM array(s) 742, address mapping circuit 736 and NV watchdog circuit 728-0. DRAM 752 can be accessed by MCU 704 via DRAM controller 758.

Figure 7A:
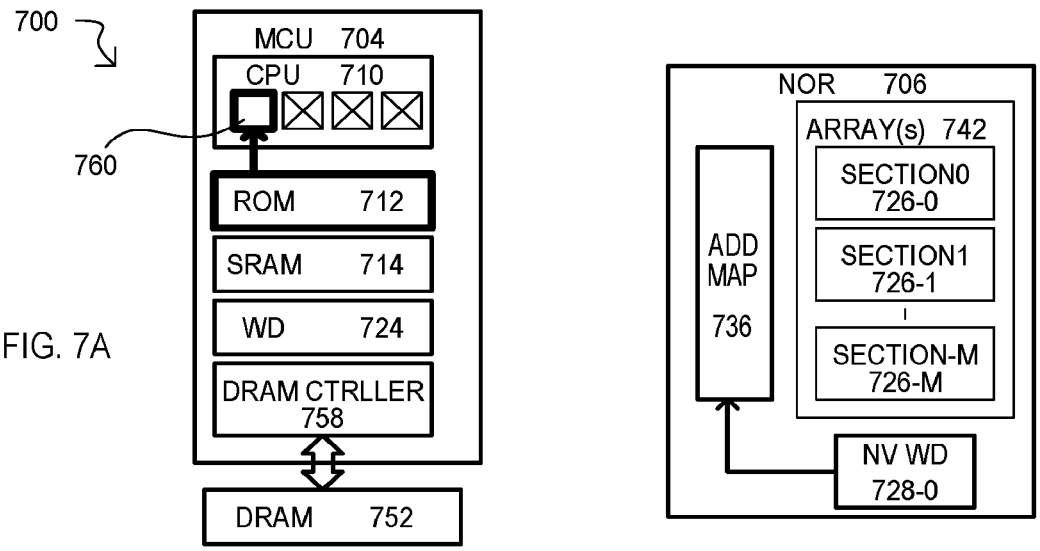
FIGS. 7A to 7D are diagrams showing boot and related operations of a system according to embodiments.

FIG. 7A shows the start of a booting operation. Upon power-on or reset, a CPU 710 of MCU 704 can execute initial boot code from ROM 712. A CPU 710 can have multiple cores, however, only one active core 760 can execute the instructions.

Figures 0, 7B:
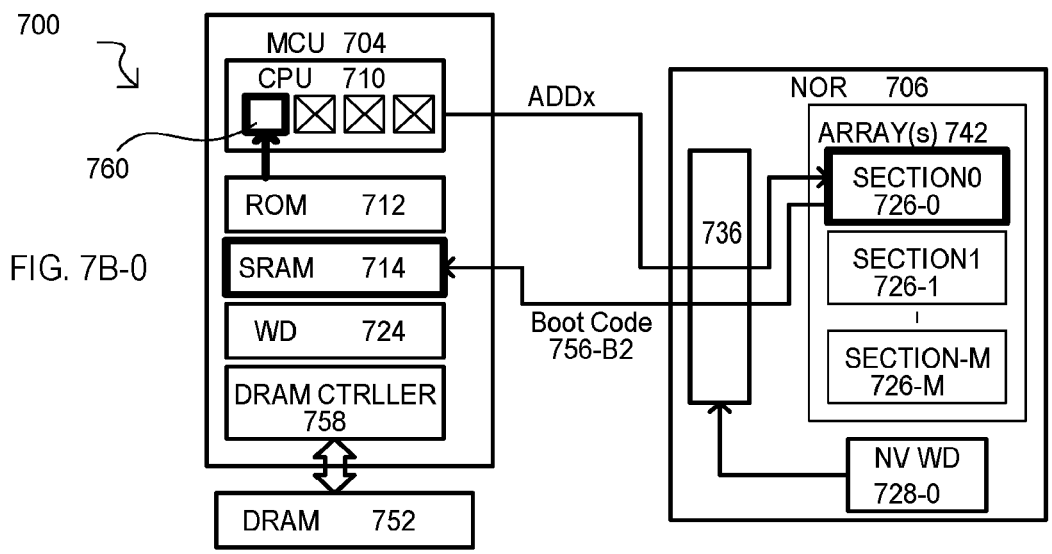
Figures 1, 7B:
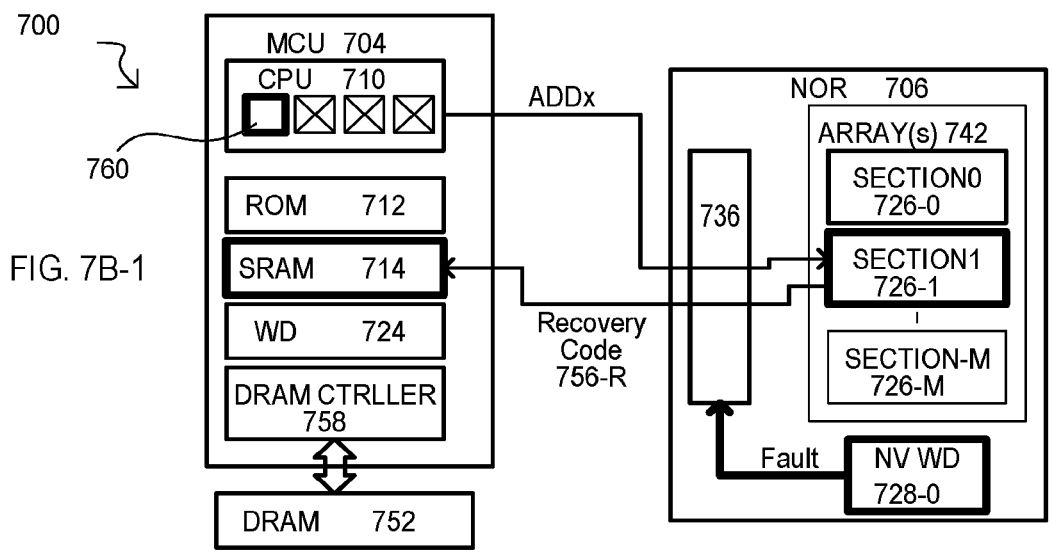

FIGS. 7B-0 and 7B-1 show how booting operations can diverge depending upon a state of NOR device 706. FIG. 7B-0 shows operations in the event NOR device 706 has a "no fault" state. In executing boot code from ROM 712, CPU 710 can generate address values ADDx to access NOR device 706. By operation of address mapping circuit 736, accesses by MCU 704 at address range ADDx can fetch boot code 756-B2 from section 726-0 of NOR device 706 to SRAM 714. CPU 710 can then execute the boot code from SRAM 714. In another embodiment, CPU 710 can execute the boot code directly from NOR device 706.

FIG. 7B-1 shows operations in the event NOR device 706 has a "fault" state. CPU 710 can generate the same address values ADDx to access NOR device 706. However, the operation of address mapping circuit 736 is changed, and MCU 704 can fetch recovery code 756-R from section 726-1 of NOR device 706 to SRAM 714. CPU 710 can then execute the recovery code from SRAM 714. In another embodiment, CPU 710 can execute the recovery code directly from NOR device 706.

Figure 7C:
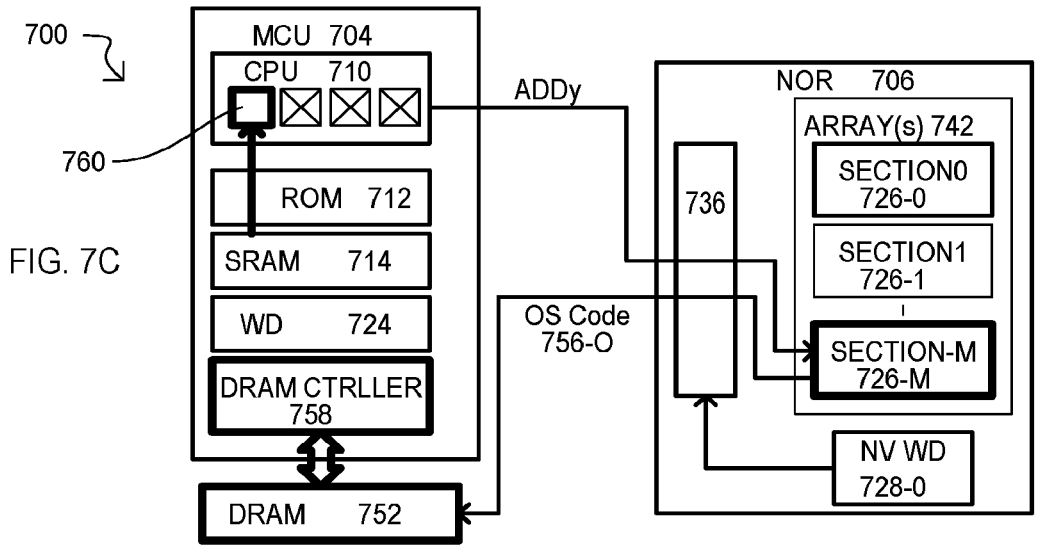

FIG. 7C shows further boot operations according to an embodiment. In executing boot code from SRAM 714, CPU 710 can generate address values ADDy to copy OS code 756-0 from NOR device 706 to DRAM 752. CPU 710 can then execute the OS code from DRAM 752.

Figure 7D:
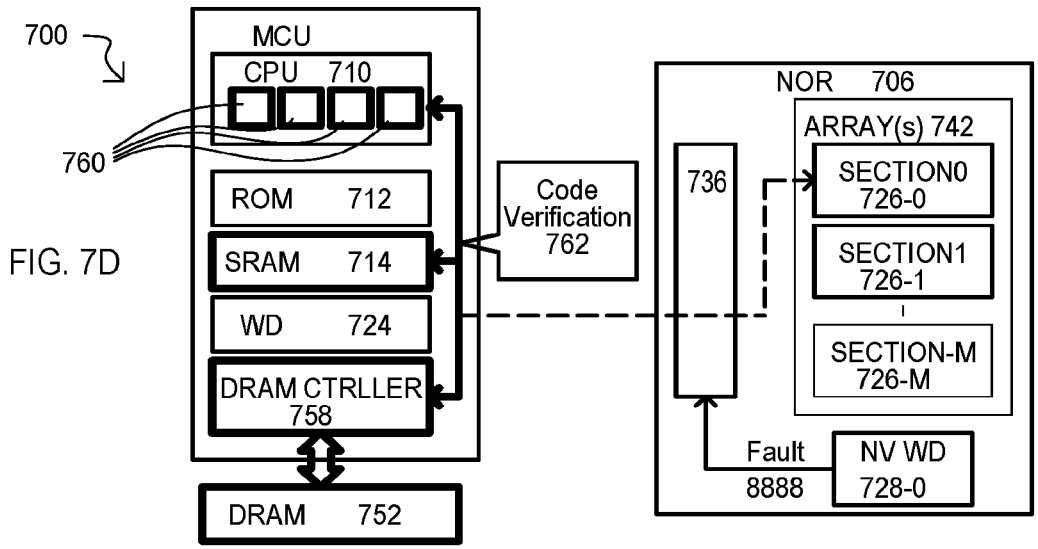

FIG. 7D shows a deferred code verification operation according to an embodiment. In executing application code from DRAM 752, CPU 710 can execute a code verification operation 762 on boot code store by NOR device 706. In some embodiments, such boot code may still be resident in SRAM 714, in which case the code can be verified from SRAM 714. However, in other embodiments a code verification operation 762 can access code stored in NOR device 706. In the embodiment shown, a code verification operation 762 can utilize all cores 760 of CPU 710.

Figure 8B:
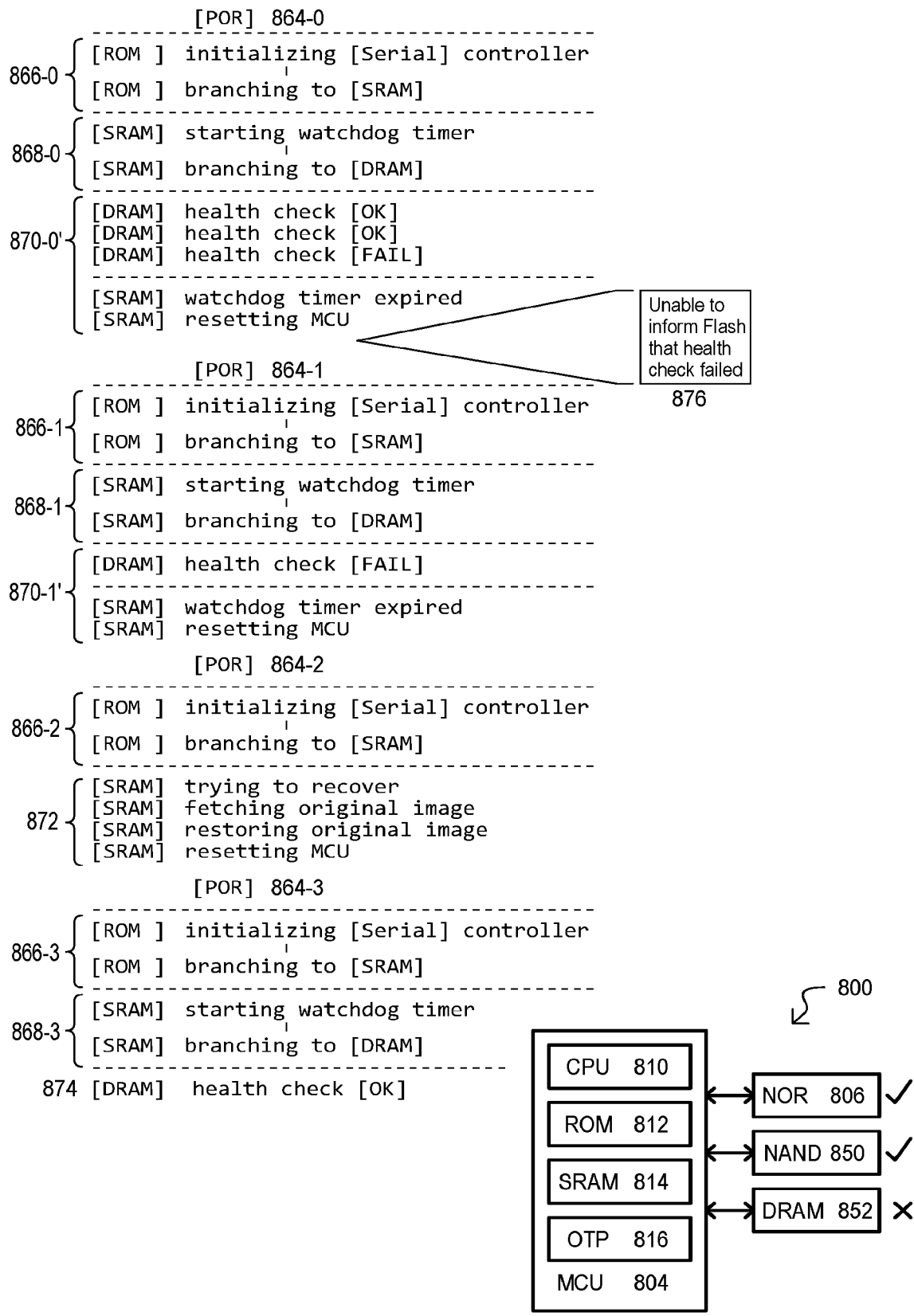
Figure 8C:
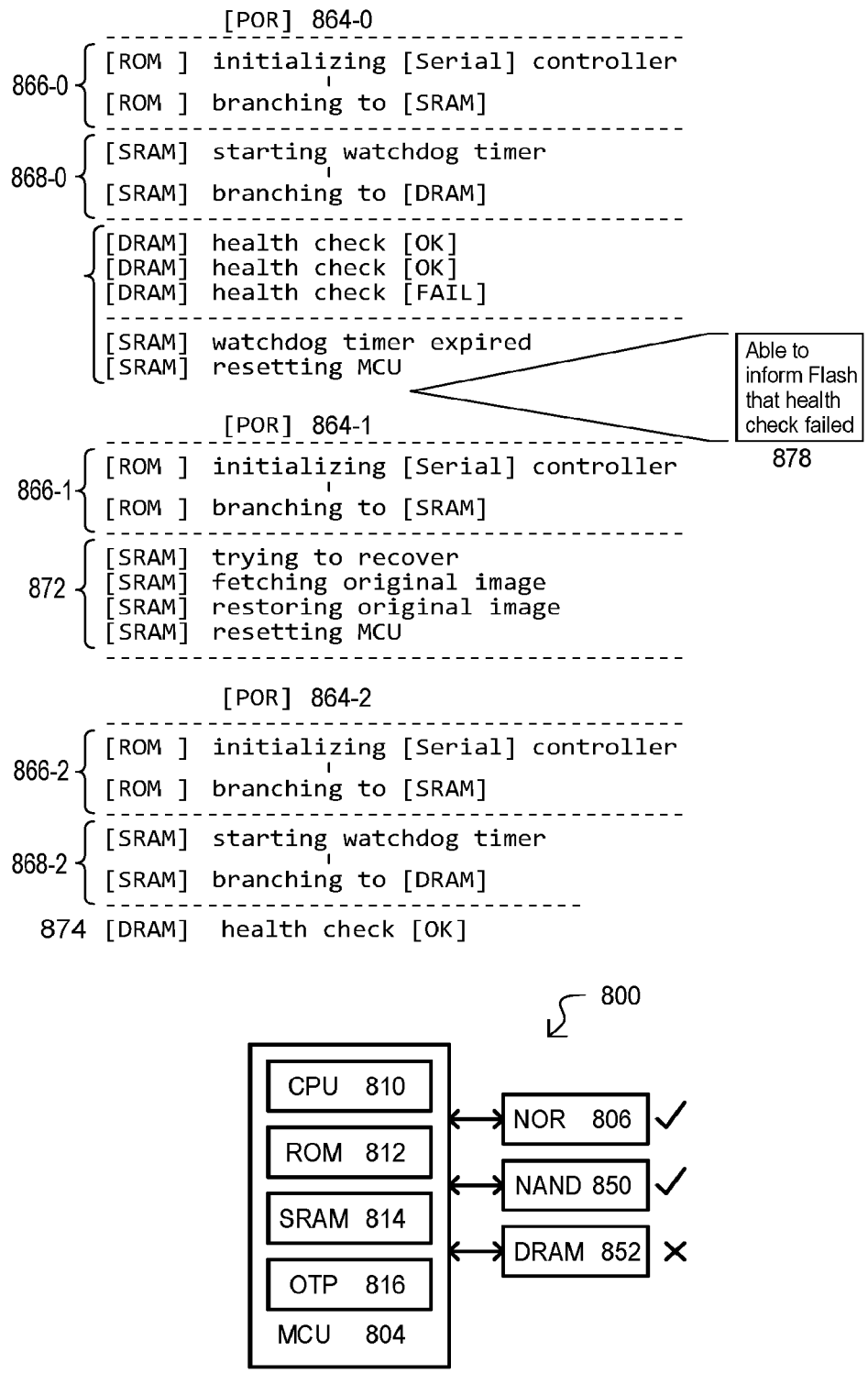

FIGS. 8A to 8C are diagrams showing resilient boot operations according to embodiments. Actions are identified by location of code being executed. Also shown is a corresponding system 800, having a MCU 804, NOR device 806, NAND device 850 and DRAM device 852.

FIG. 8A shows a boot operation that can occur when a physical modification of a code image is detected.

An operation can begin with an initial POR 864-0.

MCU can then execute ROM code 866-0. This can include initializing a serial bus controller, and then fetching additional boot code from a NOR device to on-board SRAM. Control can then be passed to the boot code copied to SRAM.

MCU can execute SRAM code 868-0. This can include initializing a DRAM controller and fetching code from the NOR device to DRAM. Control can then be passed to code copied to the DRAM.

MCU can generate a health check failure 870. In some embodiments, this can include a code verification operation detecting unauthorized modifications in a code image. As a result, a state change can occur in the NOR device. This can be due to a watchdog expiration and/or an authenticated message indicating a fault state. The MCU can reset.

An operation can continue with a second POR 864-1.

An MCU can execute ROM code 866-0. However, while the ROM code remains the same, due to the state of the NOR device, recovery code is copied to SRAM rather than boot code. Consequently, when control is passed to SRAM, recover code is executed 872. Such operations can restore the modified code to a known good version (e.g., original image). The MCU can reset once again.

An operation can conclude with a third POR 864-2. MCU can boot from ROM 866-2. Then execute (restored image) code copied from NOR to SRAM 866-2. A health check at the application level 874 indicates the system is healthy (operating normally).

FIG. 8B shows a boot operation that can occur when a physical modification of a code image occurs during run-time.

An operation proceed as in FIG. 8A, with an initial POR 864-0, execution of ROM code 866-0, execution of code copied from the NOR device and passing control to code copied to DRAM 868-0.

An MCU can initially operate normally. Initially, a code image can be determined to be valid. However, subsequently, during run-time, an unauthorized modification in a code image is detected. As a result, the MCU can reset 870-0'. However, due to the timing of the fault detected, the NOR device is not informed of the health check failure 876. As a result, the NOR device nonvolatile state is not changed.

An operation can continue with a second POR 864-1. Because the code image has been changed, it can be detected in the same manner as FIG. 8A. An MCU can then execute ROM code 866-1 and then SRAM code 868-1 (which may be invalid). The MCU can detect health check failure 870-1' and reset. Further, a nonvolatile state of the NOR device can be changed.

An operation can continue with a third POR 864-2. An MCU can execute ROM code 866-0 and then, because the state of the NOR device has changed, execute recovery code and reset 872.

An operation can conclude with a fourth POR 864-3, and normal boot operation (866-3, 868-3, 874).

FIG. 8C shows a boot operation that can occur when a physical modification of a code image occurs during run-time. However, the MCU is able to inform the NOR device of the error.

An operation proceed as in FIG. 8B, with an initial POR 864-0, execution of ROM code 866-0, and detection of run-time alternation of the code image 870-0'. However, due to the error and operating conditions (e.g., watchdog states), the MCU can inform the NOR device of the failure (e.g., an authenticated message). Consequently, NOR device can change state and provide the recovery image on the next POR.

An operation can continue in the same manner as FIG. 8A, with a recovery operation 872 following a second POR 864-1, and a good health check following a third POR 864-2.

While embodiments can include any suitable system that stores boot code on an external device, high performance, compact systems, such as embedded systems, can particularly benefit as embodiments of the invention.

Figure 9A:
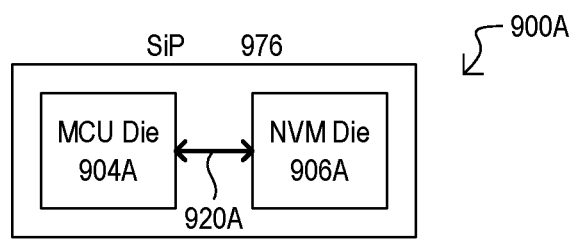
FIGS. 9A and 9B are block diagrams of a system-in-package device and embedded system according to embodiments.

FIG. 9A shows a system 900A according to an embodiment. A system 900A can include a system-in-package (SiP) package 976 having a MCU die 904A and separate NVM die 906A in communication over a memory bus 920A of the SiP package. MCU die 904A can include a MCU according to embodiments herein or equivalents. A NVM die 906A can include an NVM device (e.g., NOR flash) according to embodiments herein or equivalents.

An embedded system can include processor circuits, associated memory, and I/O circuits, typically formed in a compact structure. The embedded system can be dedicated to a particular function, or set of functions, in a larger system. For many embedded systems, high performance flash-less MCUs (e.g., application processors) can be the processor of choice. As noted herein, high performance flash-less MCUs are typically fabricated at an advanced processing nodes where embedding flash is both technologically challenging and expensive. Consequently, external flash remains the best solution for storing boot code.

In many applications, an embedded system is expected to communicate with a remote authority that checks its health periodically. As noted herein, a remote authority can be located outside of the embedded device. As but two possible examples, a remote authority can be a remote server, requiring network access, or it can be a highly secured chip within the larger system in which the embedded device is used.

Figure 9B:
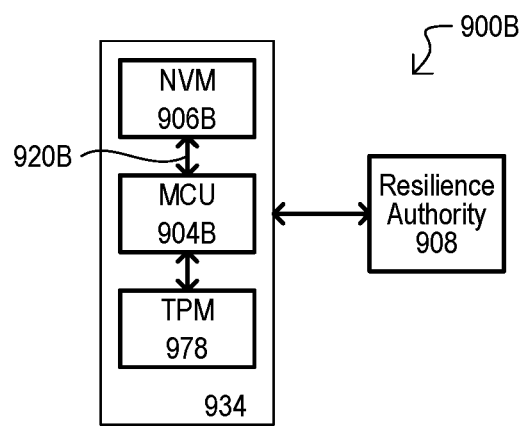

FIG. 9B is a block diagram of a system 900B according to another embodiment. A system 900B can include an embedded system 934 and resilience authority 908. Embedded system 934 can include a NVM device 906B, MCU 904B and trusted platform module (TPM) 978. MCU 904B and NVM device 906B can take the form of any of those shown in the embodiments herein or equivalents. A TPM 978 can include security circuits for executing security related functions for the embedded system 934, including but not limited to storing cryptographic keys and executing authentication operations.

A resilient authority 908 can be a remote authority that can execute resilience functions as described herein, including sending watchdog deferment indications to NVM device 906B and/or MCU 904B. As noted herein, defer indications can be transmitted via authenticated communications.

Figure 10:
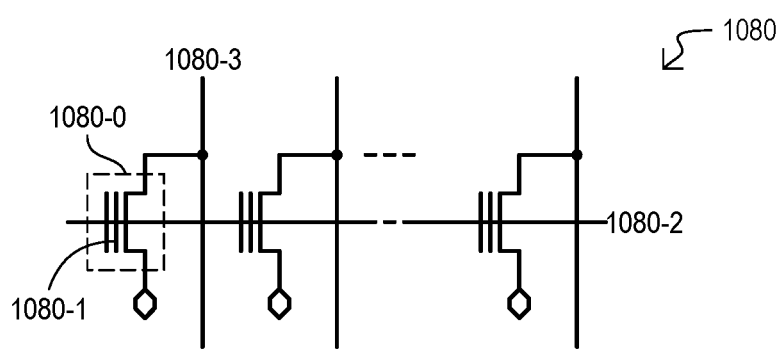
FIG. 10 is a schematic diagram of a NVM array that can be included in embodiments.

While embodiments can include any suitable NVM array structure and NVM cell type, some embodiments can include 1-transistor (1T) NOR type arrays. FIG. 10 is a schematic diagram of a 1T NOR array 1080 that can be included in embodiments. Array 1080 can include a number of memory cells (one shown as 1080-0) arranged into rows and columns, with memory cells of a same row being connected to a same word line (one shown as 1080-2) and memory cells of a same column being connected to a same bit line 1080-3. In some embodiments, memory cells (1080-0) can be formed with a single transistor structure, having a charge storing structure 1080-1 between a control gate and a channel. A charge storing structure 10801 can store one or more bits of data as charge (or absence thereof).

Figure 11:
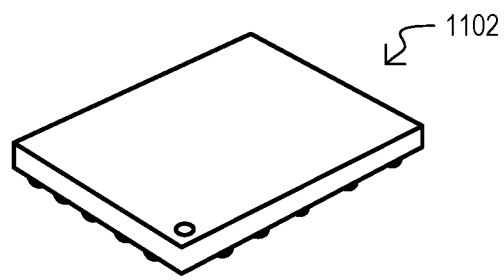
FIG. 11 is a diagram of a standalone NVM device according to an embodiment.

While embodiments can include systems with memory devices operating in conjunction with a host device, embodiments can also include standalone nonvolatile memory devices that can selectively switch address mapping between different locations in response to a watchdog timer, or the like, where the switch in address mapping is nonvolatile. While such standalone memory devices can include multiple integrated circuits formed in a same package, in some embodiments, memory devices can be advantageously compact single integrated circuits. FIG. 11 shows a packaged single chip NVM device 1102. However, it is understood that memory devices according to embodiments can include any other suitable packaging type, including direct bonding of a memory device chip onto a circuit board substrate.

Figure 12:
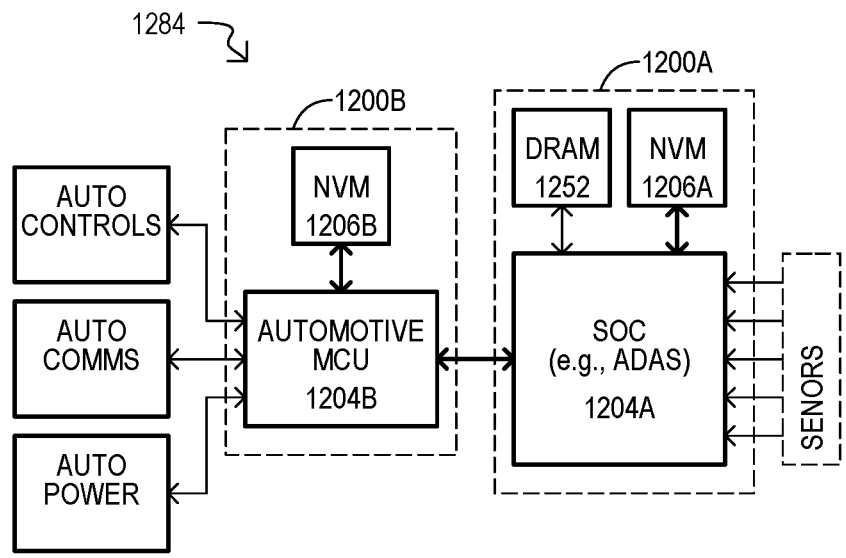
FIG. 12 is a diagram of an automotive system according to an embodiment.

Embodiments can include any suitable system having a processor that stores boot code on an external NVM device that can benefit from or require boot resiliency. However, embodiments can be particularly advantageous in high reliability systems, such as automobile systems. FIG. 12 shows an automobile system 1284 according to an embodiment. Automobile system 1284 can include various systems, two shown as 1200A and 1200B, which can be embedded systems. System 1200A can include a controller device 1204A, NVM device 1206A and DRAM 1252. A controller device 1204A can be a system-on-chip (SoC), and can include processor circuits (e.g., MCU, CPU) as described herein, or equivalents. In some embodiments, system 1200A can be an advanced driver assistance system (ADAS). System 1200B can include MCU 1204B and NVM device 1206B, which can take the form of those described in embodiments herein or equivalents.

In this way, automobile systems with high performance processing devices (advanced node MCUs) can include external nonvolatile storage of boot code, while at the same time having fast yet resilient boot capabilities.

Figure 13:
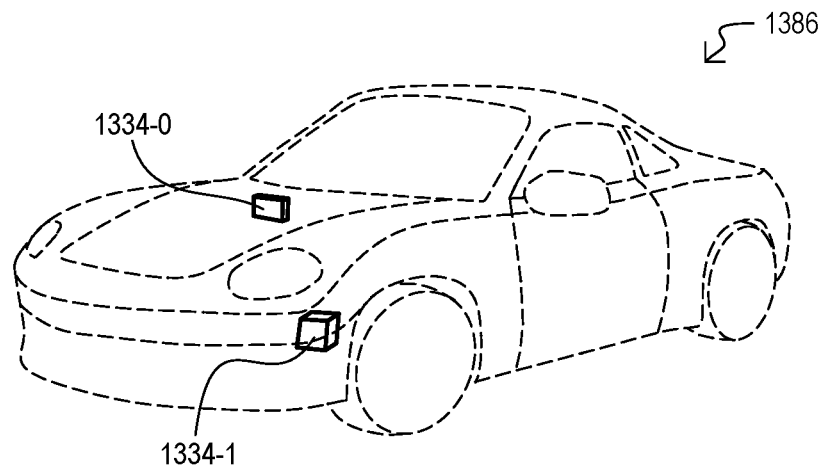
FIG. 13 is a diagram of a vehicle according to an embodiment.

Referring to FIG. 13 an automobile 1386 according to an embodiment is shown in a diagram. An automobile 1386 can have numerous embedded system (two shown as 1334-0 and 1334-1) that operate with boot code stored in a separate NVM device, with such NVM devices providing resilient boot capabilities as described herein and equivalents. Embedded systems (1334-0, 1334-1) can include an electronic control unit (ECU) and/or ADAS. However, in other embodiments such embedded systems can include a dashboard display/control sub-system and/or an infotainment sub-system, as but two of numerous possible examples. Each embedded system (1334-0, 1334-1) can include a processor device (e.g., MCU) and one or more NVM devices and employ resilient boot capabilities as described herein, or equivalents.

While embodiments above have shown various systems, devices and corresponding methods, additional methods will be described with reference to flow diagrams.

Figure 14:
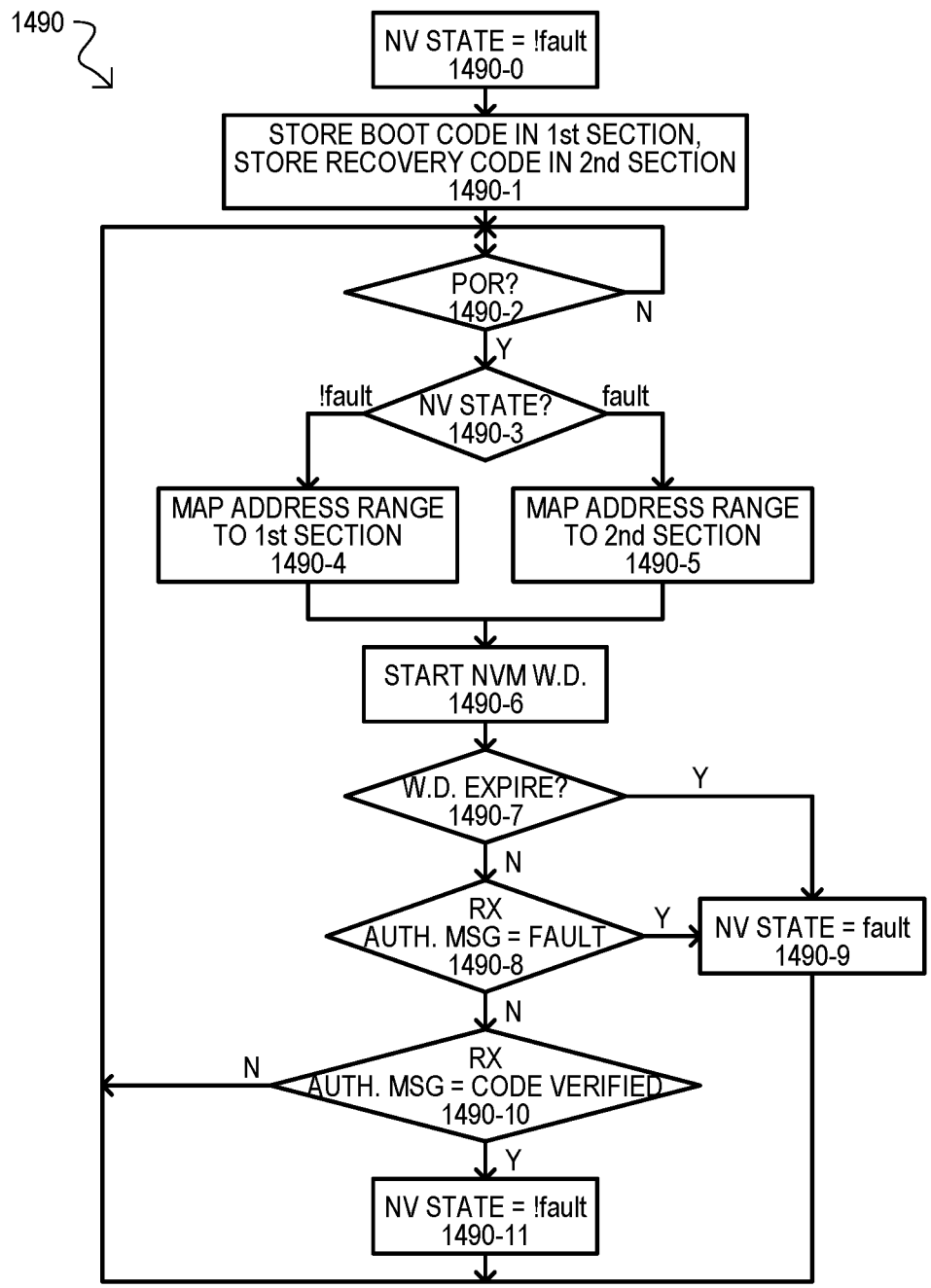
FIG. 14 is a flow diagram of a method according to an embodiment.

FIG. 14 is a flow diagram of a method 1490 according to an embodiment. In some embodiments, a method 1490 can be executed by an NVM device. A method 1490 can include setting a NV state indication to a "no fault" value 1490-0. A NV state indication can maintain a state of a NVM device in a nonvolatile fashion.

Boot code can be stored in a first section of an NVM device, and recovery code can be stored in a second section of the NVM device 1490-1. In some embodiments, such boot code can be for a latter portion of a boot operation, with boot code for an initial portion of the boot operation being provide by another memory device (e.g., on-board ROM). Recovery code can include code that remedies an invalid boot operation. In some embodiments, recovery code can direct a processing device (e.g., MCU) to execute boot code that is known to be good. Such recovery operations an include any suitable method, including but not limited to rewriting the first section of the NVM device with known good boot code, including previous versions or a known secure version; or retrieving code from a remote source via a secure (e.g., authenticated) communication session. As noted herein, first and second sections can be different physical locations of the NVM device.

In the event of a power-on or reset event 1490-2, a predetermined address mapping can be put in place according to the NV state indication (1490-3). If the NV indication indicates no fault (!fault from 1490-3), the predetermined address range can be mapped to the first section 1490-4. If the NV indication indicates a fault (fault from 1490-3), the predetermined address range can be mapped to the second section 1490-5. In some embodiments, the predetermined address range can correspond to a logical boot code address of a controller device. Such address remapping can take the form of any of the embodiments disclosed herein or equivalents.

A method 1490 can start a NVM device watchdog period 1490-6. Such a watchdog period can be deferred by a remote authority as described herein. If the watchdog period expires (Y from 1490-7), the NV indication can be set to the fault value 1490-9. Further, if the NVM device receives an authenticated message indicating a fault condition 1490-8, the NV indication can be set to the fault value 1490-9. If the NVM device receives an authenticated message indicating that the code is valid (Y from 1490-10), the NV indication can be set to the no fault value 1490-11. In some embodiments, such authenticated message can be received from a controller device, or the like.

Figure 15:
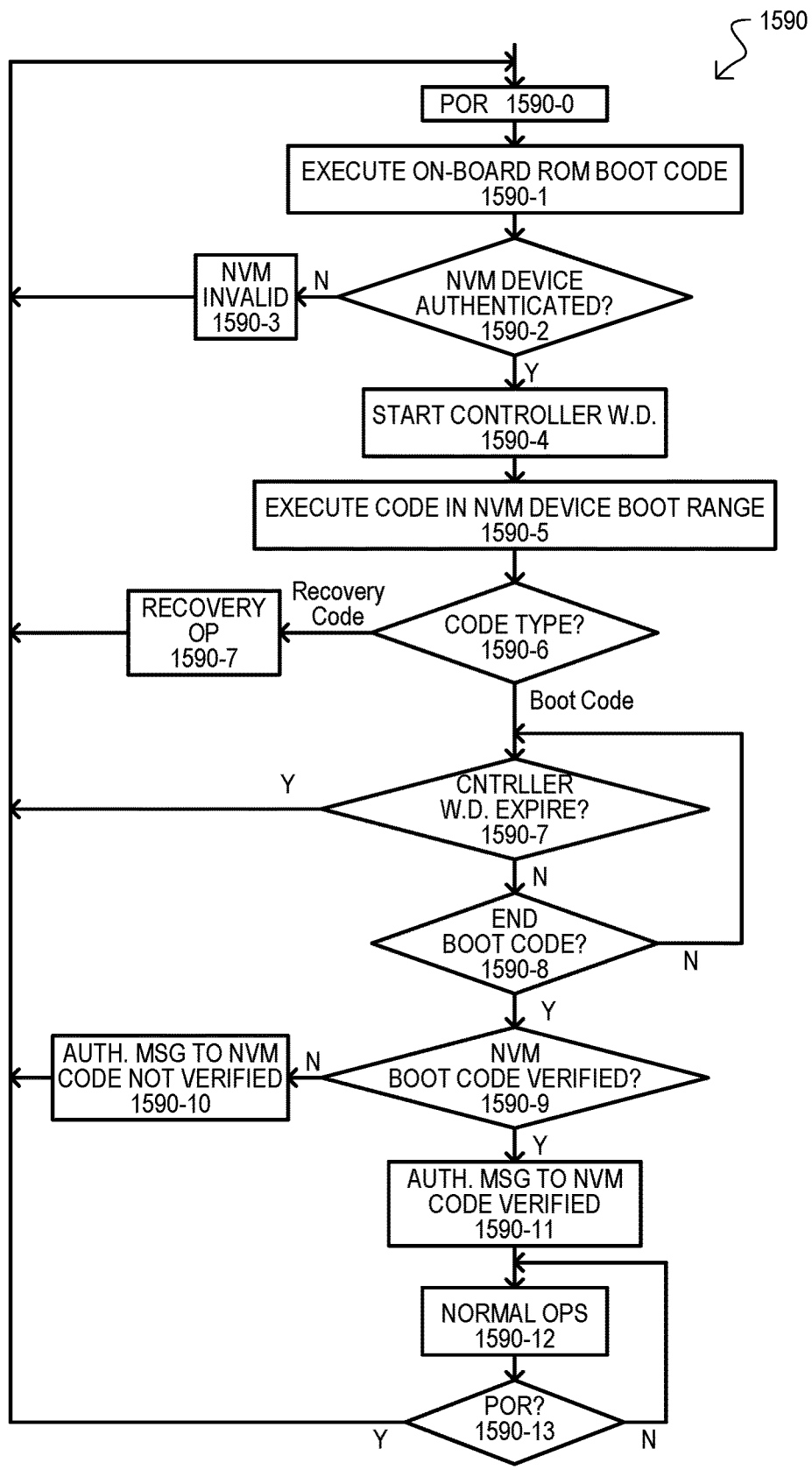
FIG. 15 is a flow diagram of a method according to another embodiment.
Figure 16:
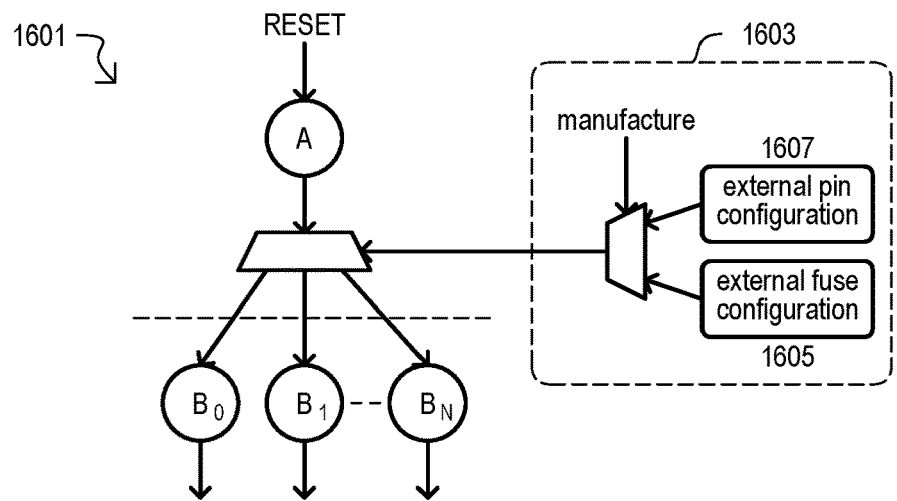
FIG. 16 is a block diagram of boot options for a system.
Figure 17:
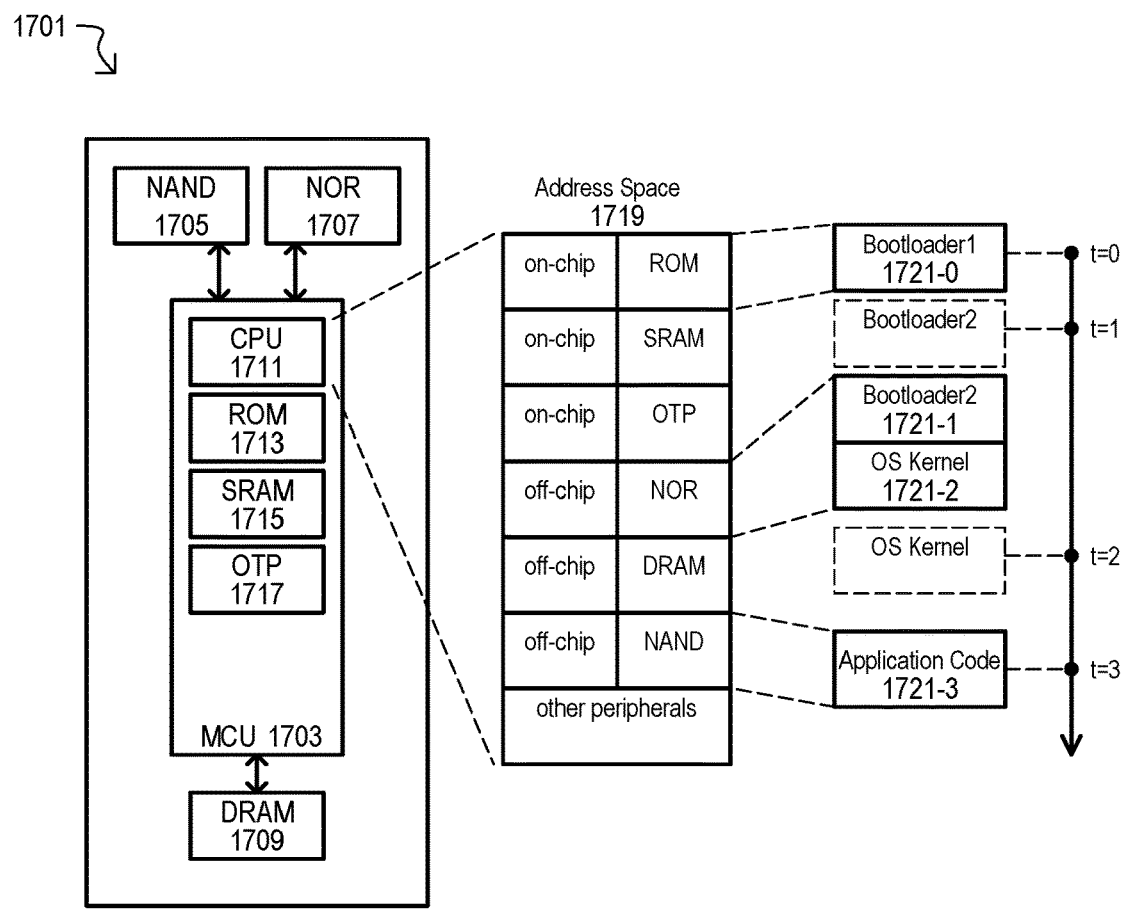
FIG. 17 is a block diagram of a conventional system and corresponding memory address space.
Figure 18A:
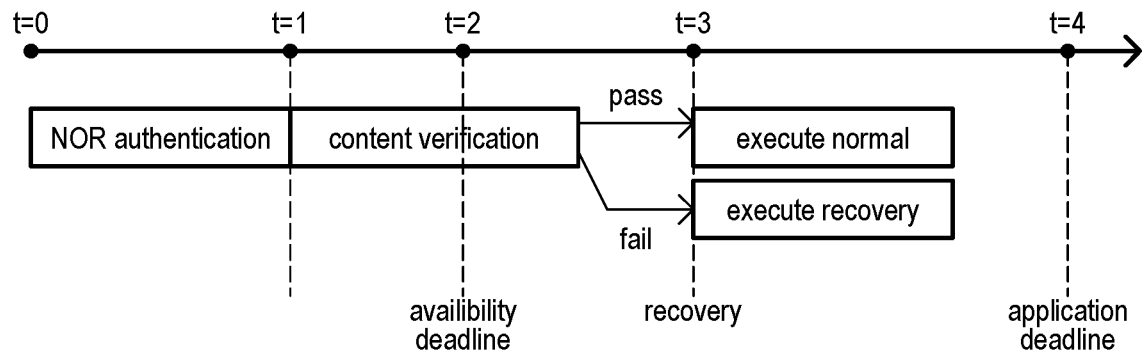
FIGS. 18A and 18B are timing diagrams showing conventional boot operations.
Figure 18B:
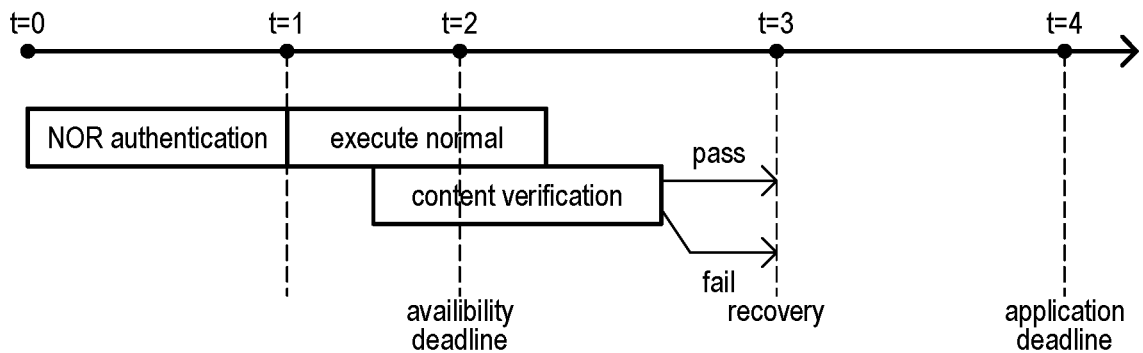

FIG. 15 is a flow diagram of a method 1590 according to another embodiment. In some embodiments, a method 1590 can be executed by a controller device accessing an external NVM device in a boot and related operations. Following a power-on or reset operation 1590-0, a method 1590 can include executing on-board ROM boot code 1590-1. Such initial boot code can enable basic functions of a controller device. An authentication operation can seek to authenticate an external NVM device 1590-2. Such an operation can include any suitable method, including a cryptographic exchange between the controller device and NVM device. If the NVM device cannot be authenticated (N from 1590-2), the NVM device can be determined to be invalid 1590-3. In some embodiments, in response to an invalid NVM device, a controller device can issue an error indication, or record an error value in an internal nonvolatile memory.

If the NVM device is authenticated (Y from 1590-2), a method 1590 can start a controller watchdog period 1590-4. Such a watchdog period can be deferred by a remote authority as described herein and equivalents. Code resident in a boot address range of the NVM device can be executed 1590-5. Such an action can include copying the code to another memory (e.g., on-board SRAM) or executing the code in from the NVM device directly (i.e., execute in place, XIP). As understood from embodiments herein, a controller device may not know what code is being executed.

If the executed NVM code is recovery code (Recovery Code from 1590-6), a method 1590 can execute recovery operations 1590-7. Recovery operations can include any of those described herein or equivalents. If the executed NVM code is boot code (Boot Code from 1590-6), a method 1590 can determine if a watchdog period has expired 1590-7. It is understood that while a watchdog expiration step is shown at a particular location in the flowchart of FIG. 15, such an operation can be independent of other steps, occurring in the background of other operations. Accordingly, the location of watchdog step 1590-7 should not be construed as limiting.

If a watchdog period is not expired (N from 1590-7) and all NVM boot code has been executed (Y from 1590-8), a method 1590 can perform a boot code verification operation 1590-9. Such an action can include, but is not limited to, loading an operating system, turning control over the operating system, and executing a code verification application. Code verified can include, but is not limited to, the boot code stored in the NVM device. If boot code fails verification (N from 1590-9), an authenticated message can be sent to the NVM device indicating so 1590-10.

If the boot code passes verification (Y from 1590-9), an authenticated message can be sent to the NVM device indicating so 1590-11. A method 1590 can proceed with normal operations 1590-12. Such an action can include a controller device executing application code resident on other storage devices. Such operations can continue in the absence of a POR or similar event (N from 1590-13).

If the NVM device is determined to be invalid 1590-3, recovery operations occur 1590-7, the watchdog period expires (Y from 1590-7), or an authenticated message indicating code verification failure is generated 1590-10, a method 1590 can execute a POR operation 1590-0.

Embodiments can advantageously provide fast and resilient boot operations for systems that utilize external memory for storing boot code.

Embodiments can be included in applications requiring such resilience, such as L4 and/or L5 autonomous vehicles.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A storage device, comprising:
   at least one nonvolatile (NV) memory array that includes
      a first section having a first physical address range, and
      a second section having a second physical address range;
   a nonvolatile fault indication that can be set to at least a fault state or a no-fault state;
   a memory watchdog circuit configured to set the fault indication to the fault state in response to an expiration of a predetermined watchdog period, the watchdog period being reset in response to a defer indication;
   an address mapping circuit configured to,
      in response to the fault indication having the no fault state, mapping input addresses to the first physical addresses range, and
      in response to the fault indication having the fault state, mapping the input addresses to the second physical address range; and
   an authentication circuit configured to authenticate messages received by the storage device, and to generate the defer indication from predetermined authenticated messages.

2. The storage device of claim 1, wherein:
   the first section is configured to store boot code for a processor of a system; and
   the second section is configured to store recovery code for the processor, the recovery code including procedures to address boot failures of the processor.

3. The storage device of claim 1, wherein:
   the memory watchdog circuit is configured to set the fault indication to the fault state in response to at least a first type authenticated message, and to set the fault indication to the no fault state in response to at least a second type authenticated message.

4. The storage device of claim 1, further including:
   decoder circuits configured to access the NV memory array in response to decoder address inputs; and
   the address mapping circuit is further configured to set a value of at least one more significant bit of the decoder address inputs based on a state of the fault indication; wherein
   the input addresses correspond to less significant bits of the decoder address inputs.

5. The storage device of claim 1, wherein the at least one NV memory array comprises a NOR flash array.

6. A method, comprising:
   storing boot code for a processor of a system in a first physical address range of a nonvolatile (NV) memory device, the processor being external to the NV memory device;
   storing recovery code for the processor in a second physical address range of the NV memory device;
   starting a watchdog circuit in the NV memory device that is configured to set a fault indication to a fault state in response to the expiration of a watchdog period, the watchdog period being reset in response to a defer indication; and
   by operation of an address mapping circuit of the NV memory device,
      in response to the fault indication having a no-fault state, mapping input address values to the first physical address range and not the second physical address range, and
      in response to the fault indication having the fault state, mapping the input address values to the second physical address range and not the first physical address range;
   storing operating system (OS) code in a third physical address range of the NV memory device; and
   by operation of the processor, generating second input address values to read the OS code from the NV memory device; wherein
   the fault indication is nonvolatile.

7. The method of claim 6, wherein:
   resetting the watchdog period in response to the defer indication includes receiving a message from a source external to the NV memory device, authenticating the message, and
   in response to the authenticated message being a defer message, generating the defer indication.

8. The method of claim 7, further including:
   generating the defer message from a remote authority, the remote authority selected from the group of: a remote server configured to communicate over a network with the NV memory device, and a secure device connected via a wired bus to the NV memory device.

9. The method of claim 6, further including:
by operation of the processor, generating the input address values to read the boot code from the NV memory device into a volatile memory of the system.

10. The method of claim 6, further including:
by operation of the processor, generating the input address values to execute the boot code or recovery code directly from the NV memory device.

11. The method of claim 6, further including:
by operation of the processor, verifying the boot code;
transmitting a first type message to the NV memory device in response to the boot code not passing verification, and transmitting a second type message to the NV memory device in response to the boot code passing verification; and
by operation of the NV memory device,
 setting the fault indication to the fault state in response to the first type message, and
 setting the fault indication to the no-fault state in response to the second type message.

12. The method of claim 11, wherein:
the processor of the system comprises a plurality of cores;
the generating of input address values to read the boot code from the NV memory device is performed by M cores of the system processor; and
the verifying of the boot code is performed by N cores of the system processor, where N>M, and N and M are natural numbers.

13. The method of claim 6, further including:
starting a processor watchdog circuit in the processor, the processor watchdog circuit configured to generate a processor fault indication in response to the expiration of a processor watchdog period, the processor watchdog period being reset in response to a processor defer indication; and
restarting the processor to a predetermined state in response to the processor fault indication.

14. A system, comprising:
a nonvolatile (NV) memory device comprising:
 at least one array of NV memory cells that includes
  a first section having a first physical address range, and
  a second section having a second physical address range;
 a nonvolatile fault indication that can be set to at least a fault state or a no-fault state;
 a memory watchdog circuit configured to set the fault indication to the fault state in response to an expiration of a predetermined watchdog period, the watchdog period being reset in response to a defer indication;
 an address mapping circuit configured to
  map input addresses to the first physical addresses range in response to the fault indication having the no-fault state, and
  map the input addresses to the second physical address range in response to the fault indication having the fault state; and
 communication circuits configured to receive defer indications from a communication path external to the NV memory device
a controller device configured to verify the boot code and generate a code verification message for authentication by the NV memory device in response thereto, the controller device coupled to the NV memory device via a memory bus and comprising:
 at least one controller processor configured to generate and transmit the input addresses over the memory bus to read data from the NV memory device; and
the NV memory device is configured to
 store boot code for the controller device in the first section, and
 store recovery code for the controller device in the second section, the recovery code including processes to address boot faults of the controller device.

15. The system of claim 14, wherein:
the NV memory device further includes
 decoder circuits configured to access the at least one array in response to decoder address inputs; and
 the address mapping circuit is configured to set a value of at least one more significant bit of the decoder address inputs based on at least the fault indication; wherein
 the input addresses are less significant bits of the decoder address inputs.

16. The system of claim 14, further including:
a remote authority device, physically separate from the NV memory device and controller device, and configured to generate a defer message; and
the NV memory device further includes authentication circuits configured to authenticate the defer message and generate the defer indication in response to an authenticated defer message.

17. The system of claim 16, wherein:
the remote authority device is selected from the group of:
a remote server configured to communicate over a network with the NV memory device, and a secure device connected via a wired bus to the NV memory device.

* * * * *